United States Patent
Fukuchi et al.

(10) Patent No.: US 8,320,779 B2
(45) Date of Patent: Nov. 27, 2012

(54) LIGHT RECEIVER, OPTICAL COMMUNICATION SYSTEM AND METHOD

(75) Inventors: Kiyoshi Fukuchi, Tokyo (JP);
Toshiharu Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 1194 days.

(21) Appl. No.: 11/992,398

(22) PCT Filed: Oct. 4, 2006

(86) PCT No.: PCT/JP2006/319880
§ 371 (c)(1),
(2), (4) Date: Mar. 21, 2008

(87) PCT Pub. No.: WO2007/040247
PCT Pub. Date: Apr. 12, 2007

(65) Prior Publication Data
US 2009/0290876 A1    Nov. 26, 2009

(30) Foreign Application Priority Data

Oct. 5, 2005    (JP) .................................. 2005-291832

(51) Int. Cl.
*H04B 10/06*    (2006.01)
(52) U.S. Cl. ........ 398/212; 398/202; 398/188; 398/208; 398/209; 398/213; 398/79; 398/81; 398/158; 398/159
(58) Field of Classification Search .................. 398/202, 398/208, 209, 212, 213, 214, 104, 105, 106, 398/107, 188, 183, 158, 159, 79, 81, 161, 398/162, 203, 204, 205, 206, 207, 147
See application file for complete search history.

(56) References Cited

U.S. PATENT DOCUMENTS

| | | | |
|---|---|---|---|
| 5,617,234 A | 4/1997 | Koga et al. | |
| 7,272,327 B2* | 9/2007 | Epworth et al. | 398/212 |
| 7,398,454 B2* | 7/2008 | Cai et al. | 714/780 |
| 7,450,863 B2* | 11/2008 | Winzer | 398/204 |
| 7,603,045 B2* | 10/2009 | Hoshida et al. | 398/209 |
| 7,734,194 B2* | 6/2010 | Yonenaga et al. | 398/208 |
| 2003/0002121 A1* | 1/2003 | Miyamoto et al. | 359/183 |
| 2003/0007216 A1 | 1/2003 | Chraplyvy et al. | |
| 2004/0081470 A1* | 4/2004 | Griffin | 398/188 |

(Continued)

FOREIGN PATENT DOCUMENTS

JP    08-251105    9/1996

(Continued)

OTHER PUBLICATIONS

A. H. Gnauck et al., "Demonstration of 42.7-Gb/s DPSK Receiver With 45 Photons/Bit Sensitivity," IEEE Photonics Technology Letters, vol. 15:1, Jan. 2003, pp. 99-101.

*Primary Examiner* — Hanh Phan
(74) *Attorney, Agent, or Firm* — Foley & Lardner LLP

(57) ABSTRACT

A receiver includes wavelength demultiplexer for demultiplexing a received WDM light into light signals at respective central frequencies thereof, delay interferometer for converting a light signal output from wavelength demultiplexer into an intensity signal, and light detector for converting an output signal from delay interferometer into an electric signal. The interval between interferential frequencies of delay interferometer is 2/(2n+1) times the interval between the central frequencies of the WDM light. Logic inverting circuit outputs the output signal from the light detector while non-inverting or inverting the logic level thereof depending on the received central frequency.

20 Claims, 24 Drawing Sheets

U.S. PATENT DOCUMENTS

| | | |
|---|---|---|
| 2005/0047780 A1 | 3/2005 | Hoshida et al. |
| 2006/0193399 A1* | 8/2006 | Katagiri et al. ............... 375/308 |

FOREIGN PATENT DOCUMENTS

| | | |
|---|---|---|
| JP | 2003-060575 A | 2/2003 |
| JP | 2003-060580 A | 2/2003 |
| JP | 2003-087201 A | 3/2003 |
| JP | 2004-336575 A | 11/2004 |
| JP | 2005-080304 A | 3/2005 |
| JP | 2005-094287 A | 4/2005 |

* cited by examiner

Fig.1
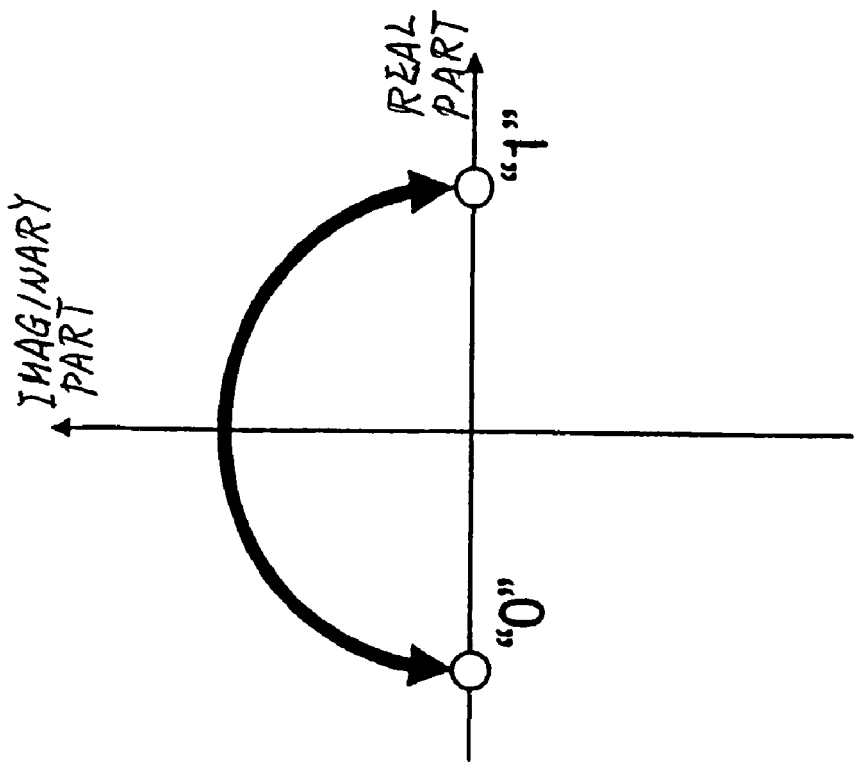
(b) DPSK
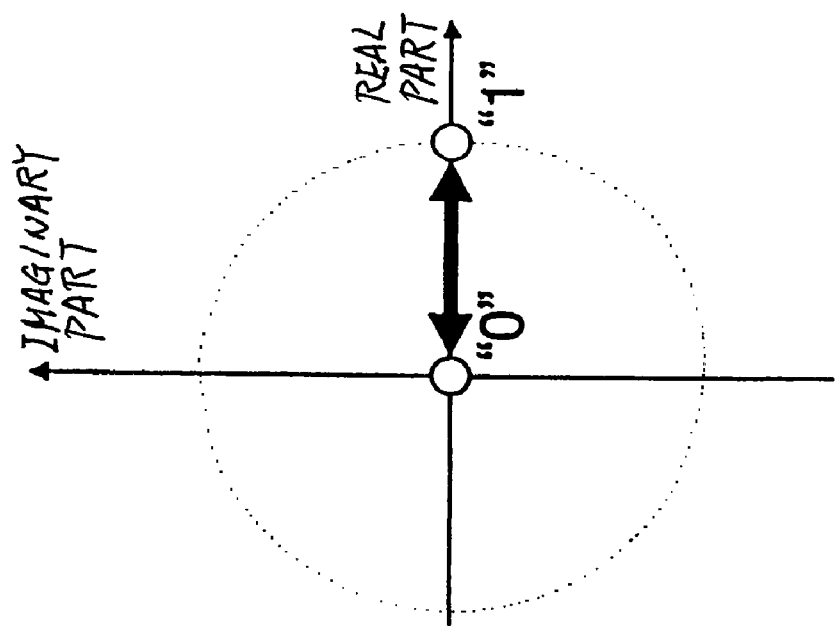
(a) INTENSITY MODULATION

LIGHT RECEIVER, OPTICAL COMMUNICATION SYSTEM AND METHOD

This application is the National Phase of PCT/JP2006/319880, filed Oct. 4, 2006, which claims priority to Japanese Application No. 2005-291832, filed Oct. 5, 2005, the disclosures of which are hereby incorporated by reference in their entirety.

TECHNICAL FIELD

The present invention relates to a receiver for receiving a phase-modulated light signal, an optical communication system incorporating such a receiver, and an optical communication method.

BACKGROUND ART

Optical communication systems employing optical fibers are an important technology for transmitting a large amount of data over a long distance. Optical communication systems that are currently in use are of the intensity modulation type. The intensity modulation process is a modulation process for assigning the "presence" and "absence" of optical pulses to "1" and "0" of digital signals. The intensity modulation process is widely used in a wide range of applications because it is easy to generate and detect modulated signals and it is possible to transmit modulated signals over a long distance.

As recent years have seen the transmission of a growing amount of information, the optical communication systems have been required to have a high-speed transmission capability. The optical communication systems that are currently in use have a data transmission rate of up to about 10 Gbps. For optical communication systems of the next generation, research efforts are being made to achieve a data transmission rate of about 40 Gbps. In addition, there is a strong demand for a reduction in the cost in view of increased transmission distances. Technologies for transmitting data over distances in excess of 1000 km are also being studied.

There are known two tasks to be accomplished in order to realize high-speed, long-distance optical communication systems.

The first task is to deal with increasing optical noise.

If an intensity-modulation optical communication system has a high data transmission rate, then it suffers from a large amount of noise because the transmission band which the system utilizes is wide. As a result, the signal to noise ratio at the signal reception end is lowered, resulting in increased code errors and lowered communication quality. A longer transmission distance requires the system to have a greater number of repeaters for amplifying optical signals to compensate for a loss of optical intensity. Optical noise generated by optical amplifiers incorporated in the repeaters accumulates to lower the signal to noise ratio at the signal reception end. For realizing high-speed, long-distance optical communication systems, therefore, it is necessary to develop a transmission system which is capable of reducing optical noise or resistant to optical noise.

In recent years, attention has been focused on the phase modulation principle, in particular the DPSK (Differential Phase Shift Keying) principle, applied to optical communication systems as a countermeasure against optical noise. The DPSK process is one of phase modulation processes for expressing information with a combination of waves that are kept out of phase with each other. According to the DPSK process, whether an optical signal is of "1" or "0" is expressed by its phase relationship to a preceding optical signal that has been sent (a signal in a preceding bit slot). Particularly, an optical communication system based on a combination of the DPSK process and a 1-bit delay detecting reception process is of high performance and can be of a simple construction.

In the system based on the combination of the DPSK process and the 1-bit delay detecting reception process, when transmission data is of "1", the transmission side changes the phase of the bit slot by 180° and transmits the data, and when the transmission data is of "0", the transmission does not change the phase of the bit slot and transmits the data.

The reception side divides the received signal, delays one of the divided signals with a 1-bit delay device, and causes the delayed signal to interfere with the other divided signal. At this time, if the signal in a preceding bit slot and the signal in a next bit slot are in phase with each other, then the interference signal has a maximum intensity level. If the signal in the preceding bit slot and the signal in the next bit slot are 180 degrees out of phase with each other, then the interference signal is extinguished. Based on this principle, the system based on the combination of the DPSK process and the 1-bit delay detecting reception process converts information expressed by a phase change into intensity information.

Using the DPSK process makes it possible to transmit data with less errors even in a reception state where the signal to noise ratio is low, than with the intensity modulation process. The reasons for this reduced-error data transmission will be described below.

FIGS. 1(a) and 1(b) are graphs showing the distances between codes "1" and "0" on a complex electric field plane. FIG. 1(a) shows the positional relationship between the codes "1" and "0" according to the intensity modulation process. FIG. 1(b) shows the positional relationship between the codes "1" and "0" according to the DPSK process.

As can be seen from FIGS. 1(a) and 1(b), the distance between codes "1" and "0" on the complex electric field plane according to the DPSK process is twice the distance between codes "1" and "0" on the complex electric field plane according to the intensity modulation process. According to the DPSK process, therefore, the same code error rate as according to the intensity modulation process is obtained even if the amount of noise is twice, i.e., even if the signal to noise ratio is 1/2. The DPSK process is thus resistant to noise and lends itself to making optical communication systems higher in transmission rate and longer in transmission distance.

The second task to be accomplished in order to realize high-speed, long-distance optical communication systems is concerned with a countermeasure against optical waveform distortions.

One major factor for causing optical waveform distortions in optical communication systems is a nonlinear optical effect of optical fibers. It is known that according to the intensity modulation process, waveform distortions caused by the nonlinear optical effect increase as the transmission rate becomes higher. It is also known that waveform distortions caused by the nonlinear optical effect pose a big problem on long-distance data transmission. In order to realize high-speed, long-distance optical communication systems, therefore, it is necessary to use optical fibers with a small nonlinear optical effect or to use a transmission process which is resistant to the nonlinear optical effect.

To accomplish the second task, Japanese Patent Laid-Open No. 2003-060580, for example, has proposed a process for using an RZ (Return to Zero) pulse for each bit of the DPSK signal. This process is called an RZ-DPSK process. According to the RZ-DPSK process, waveform distortions are suppressed by two advantages obtained by using an RZ pulse for each bit of the DPSK signal.

The first advantage is that since the optical intensity of peaks becomes greater than the average optical intensity by using RZ pulses, the signal to noise ratio is improved to make it possible to transmit data with lower optical intensity. The second advantage is that interbit pulse interference can be reduced by using RZ pulses. In view of these advantages, the RZ-DPSK process has quickly been recognized in recent years as a process for transmitting data at a data transmission rate of 40 Gbps over long distances.

According to the RZ-DPSK process, as described in a non-patent document (A. H. Gnauck, S. Chandrasekhar, J. Leuthold, L. Stulz, "Demonstration of 42.7-Gb/s DPSK Receiver With 45 Photons/Bit Sensitivity", IEEE PHOTONICS TECHNOLOGY LETTERS, VOL. 15, NO. 1, p. 99-101, January 2003), a receiver has a delay interferometer for converting a phase-modulated signal into a intensity-modulated signal. This system is referred to as a delay interference detecting system and is advantageous in that it can be reduced in size as no local oscillation light is required, compared with the known coherent reception system.

FIG. 2 is a block diagram showing a configurational example of a delay interferometer called a Mach-Zehnder interferometer.

As shown in FIG. 2, the delay interferometer comprises first directional coupler 301 for dividing an input light, delay element 304 for delaying one of the divided lights, and second directional coupler 305 for coupling output lights from first and second arms 302, 303 through which the lights divided by first directional coupler 301 are propagated.

If a phase-modulated signal is input to the delay interferometer, then delay element 304 is set to an amount of delay corresponding to a time slot commensurate with one bit of the bit rate of the phase-modulated signal.

The light (the phase-modulated signal) input to the delay interferometer shown in FIG. 2 is divided by first directional coupler 301 into two lights of equal light intensity, which are input respectively to first and second arms 302, 303. Only the light which is input to first arm 302 is shifted in phase by 90 degrees (delayed by 90 degrees) by delay element 304.

Each of the lights which have been propagated through first and second arms 302, 303 is divided into two lights by second directional coupler 305. Second directional coupler 305 has a first output port (upper port in FIG. 2) that outputs the light intensity of ½ of the light propagated through first arm 302 and the light intensity of ½ of the light propagated through second arm 303. At this time, only the light propagated through second arm 303 is shifted in phase by 90 degrees (delayed by 90 degrees from the input light) by second directional coupler 305.

Since the light propagated through first arm 302 and the light propagated through second arm 303 are shifted out of phase with each other by 90 degrees, the first output port combines and outputs the lights that are in phase with each other.

Second directional coupler 305 has a second output port (lower port in FIG. 2) that outputs the light intensity of ½ of the light propagated through first arm 302 and the light intensity of ½ of the light propagated through second arm 303. At this time, the light propagated through first arm 302, which has been shifted in phase by 990 degrees by delay element 304, is further shifted in phase by 90 degrees by second directional coupler 305. As the light propagated through first arm 302 is shifted in phase by 180 degrees and the light propagated through second arm 303 is not shifted in phase, the second output port combines the lights that are in opposite phase with each other and hence outputs no light.

When the phase of the light that is propagated through one of the arms is thus adjusted in phase such that the two lights output from the first output port of second directional coupler 305 are in phase with each other, the two lights output from the second port are in opposite phase with each other. If a CW light (continuous wave light) is input to the delay interferometer, then the first port outputs the lights in phase with each other which intensify each other, and the second port outputs no light as the lights in opposite phase with each other cancel each other.

Operation of the delay interferometer at the time a DPSK signal is input thereto will be described below.

It is assumed that the DPSK signal is expressed by a code "0" represented by a light shifted in phase by 0 and a code "1" represented by a light shifted in phase by $\pi$.

The first output port of the delay interferometer outputs lights in phase with each other which intensify each other if bits that are adjacent to each other on the temporal axis are in phase each other, and cancel and extinguish lights if the phase difference between bits that are adjacent to each other on the temporal axis is $\pi$.

The second output port of the delay interferometer outputs extinguish lights if bits that are adjacent to each other on the temporal axis are in phase each other, and outputs lights in phase with each other which intensify each other if the phase difference between bits that are adjacent to each other on the temporal axis is $\pi$ because the phase difference between the lights propagated through the two arms is 0 or $2\pi$.

Therefore, if bits that are adjacent to each other on the temporal axis are in phase each other, then the first output port outputs a light, and if the phase difference between those bits is $\pi$, then the second output port outputs a light. As a result, the phase information of the DPSK signal is converted into intensity information.

The delay difference between the lights which is caused by the propagation thereof through the two arms should preferably be equal to one time slot of the light signal such that only bits that are adjacent to each other on the temporal axis interfere with each other. If the delay difference deviates from one time slot, then an interferential component produced by interfering with another bit that is not to interfere with is introduced into the light signal output from the first output port or the second output port, generating a waveform distortion which tends to degrade the conversion from the phase information into the intensity information.

The RZ-DPSK process which uses the delay interferometer poses some problems.

The first problem is that if the delay interferometer is to receive a WDM (Wavelength Division Multiplex) light signal, for example, at a transmission rate that is currently employed as a standard rate, then the delay interferometer needs to be adjusted for each wavelength. The reasons will be described below.

The DPSK process has been developed for the purpose of being applied to optical communication systems having a transmission rate of 40 Gbps. According to ITU-T, therefore, two transmission rates of 39.81 Gb/s and 43.01 Gb/s have been determined as standard rates, and many systems are considered to employ the transmission rate of 43.01 Gb/s.

The ITU-T standards specifies that WDM optical communication systems shall multiplex information at a frequency interval of 100 GHz, and may systems employ this frequency interval.

For converting a DPSK signal having a transmission rate of 43.01 Gbps into an intensity signal using the delay interferometer, the delay difference between lights propagated through two arms may be set to one time slot, i.e., about 23.3 ps.

FIG. 3 shows the dependency on the frequency of light intensities that are output from the first output port and the second output port when a CW light is input to the delay interferometer thus adjusted. The vertical axis of the graph shown in FIG. 3 represents the light transmittance of interference lights propagated and output through the two arms and the output ports, and the horizontal axis the relative frequency at the time the WDM central frequency serving as a reference frequency is nil.

As shown in FIG. 3, the interval between the peaks of the light intensity of the interference lights that are output from the two output ports, i.e., the interval between interferential frequencies, is 43.01 GHz.

An example will be described below in which the delay difference between lights propagated through the two arms of the delay interferometer is adjusted to obtain peaks of the interference lights output from the output ports at frequency 401-c shown in FIG. 3.

At frequency 401-c, the output lights from the first and second arms of the delay interferometer and a differential circuit output representative of the difference between those output lights have good waveforms 503 shown in FIG. 4. At adjacent frequencies 401-a, b, d, e, the DPSK signal cannot properly be converted into an intensity signal as these frequencies deviate from the frequencies at which the interference lights have peaks. Specifically, as indicated by waveforms 501, 502, 504, 505 shown in FIG. 4, the amplitudes of the lights output from the arms are reduced in level and the waveforms thereof are distorted, resulting in a degraded reception capability. Particularly at frequencies 401-a, b, d, e, since frequency deviations from the frequencies at which the interference lights have peaks are different from each other, the reception capability differs from frequency to frequency.

Consequently, in order for WDM optical communication systems to convert a DPSK signal into an intensity signal using the delay interferometer, it is necessary to make fine adjustment of the delay difference between lights propagated through the first and second arms at each of frequencies (hereinafter also referred to as central frequencies) used by the WDM process, for thereby causing the interference lights to peak at the respective central frequencies. However, such adjustment is so complex as to increase the cost required to adjust the system.

The second problem is that the above scheme for adjusting the delay interferometer at each of the frequencies makes it difficult to keep stable the frequencies at which the interference lights are peaked.

As described above, in order for WDM optical communication systems to achieve a data transmission rate of 43.01 Gbps at a frequency interval of 100 GHz, it is necessary to adjust the delay difference between lights propagated through the two arms of the delay interferometer at each central frequency. Such fine adjustment can be performed by a method of slightly positionally moving mirrors disposed on the arms or the like with piezoelectric devices or the like, or a method of making the arms as quartz waveguides and adjusting the waveguide characteristics of the arms based on a thermooptical effect.

However, if the delay interferometer is equipped with an adjusting mechanism, i.e., a mechanism for varying the frequencies at which the interference lights are peaked, then the operating frequencies tend to become unstable after the adjustment. In particularly, the method of adjusting the delay difference based on the thermooptical effect is difficult to maintain stability because it is susceptible to changes in the ambient temperature. As a result, the reception capability is possibly degraded.

DISCLOSURE OF THE INVENTION

It is an object of the present invention to provide an optical receiver which is capable of stabilizing the operating frequencies of a delay interferometer without the need for adjusting the delay interferometer at each central frequency, which would pose problems upon reception of a DPSK signal, in wavelength-division-multiplex optical communication system, an optical communication system, and an optical communication method.

To achieve the above object, in accordance with the present invention, the interval between frequencies at which interference lights output from a delay interferometer of a receiver are peaked is set to 2/(2n+1) times the interval between central frequencies used in the WDM process (n represents a positive number). A logic inverting circuit or the like outputs an output signal from the receiver while non-inverting or inverting the logic level thereof depending on the received central frequency.

With the above arrangement, deviations between the frequencies at which the interference lights output from the delay interferometer are peaked and the central frequencies used in the WDM process are made constant. Therefore, the capabilities to receive the central frequencies are equalized without the need for adjusting the delay interferometer, making it possible to demodulate DPSK signals.

Consequently, it is not necessary to adjust the delay interferometer at each of the central frequencies used in the WDM process.

Since there is no need to adjust the delay interferometer, no mechanism is required for adjusting the delay interferometer. Therefore, frequency instabilities caused by an adjusting mechanism are eliminated, and the operating frequencies of the delay interferometer are stabilized.

As no mechanism is required for adjusting the delay interferometer, the delay interferometer may be reduced in size, and hence the receiver and an optical communication system incorporating the receiver may also be reduced in size.

BRIEF DESCRIPTION OF THE DRAWINGS

FIG. 1 is graph showing the distances between codes "1" and "0" on a complex electric field plane.

BEST MODE FOR CARRYING OUT THE INVENTION

1st Exemplary Embodiment

Figure 2:
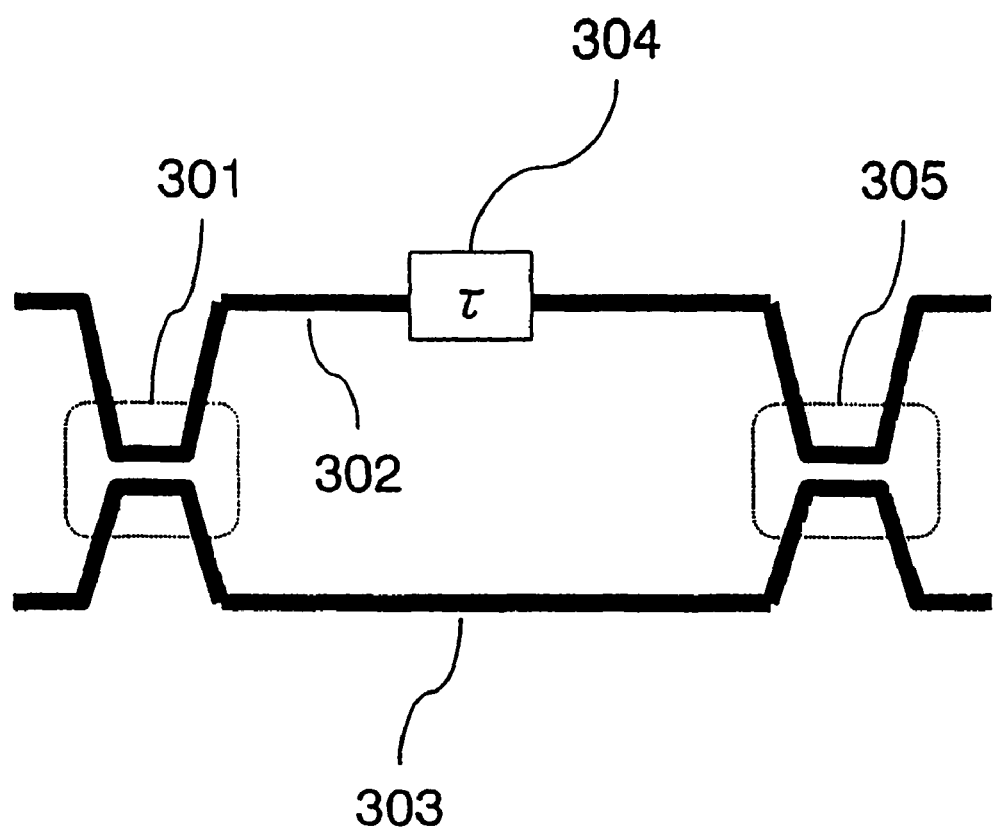
FIG. 2 is a block diagram showing a configurational example of a delay interferometer.
Figure 3:
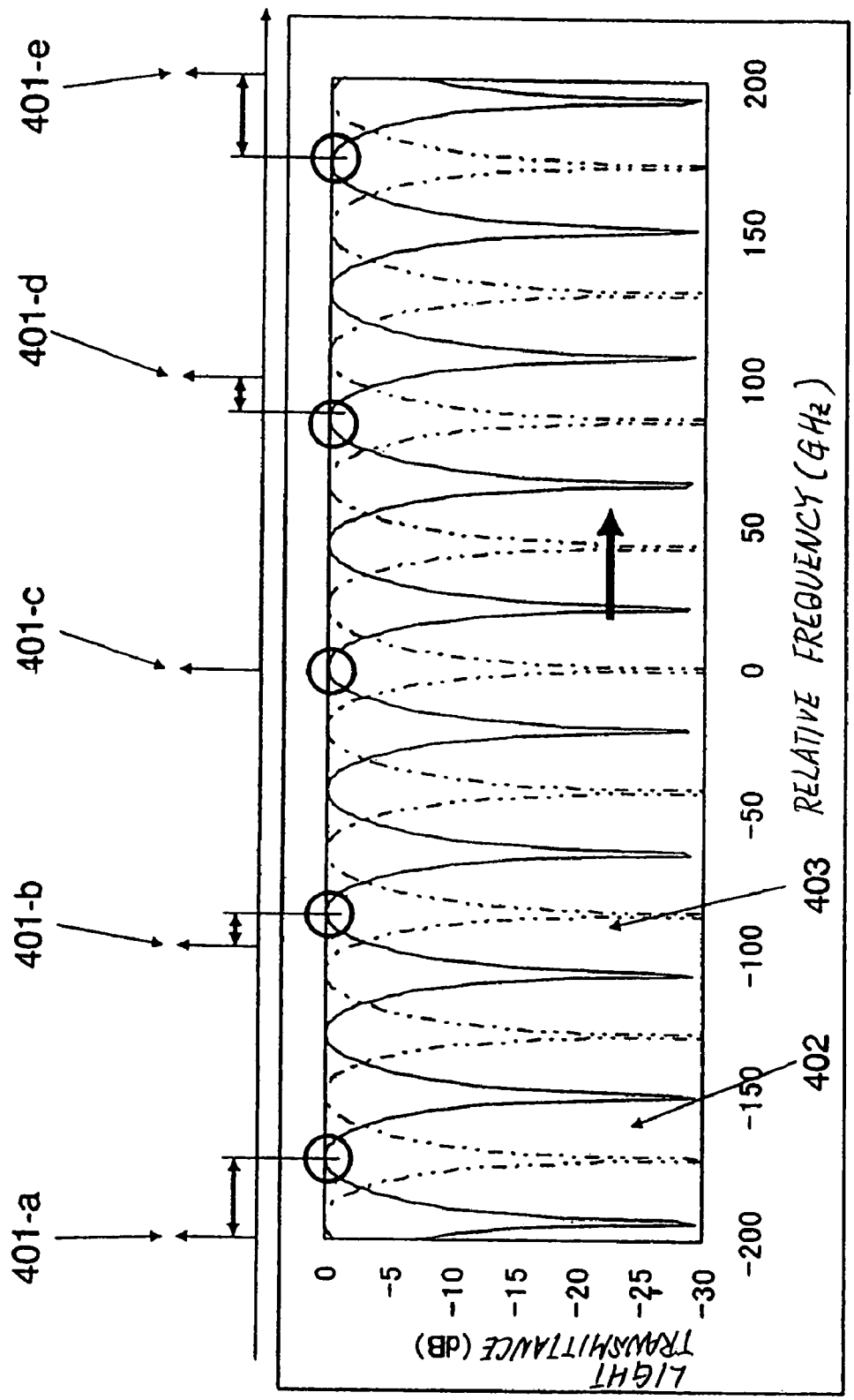
FIG. 3 is a graph showing the relationship between light intensities that are output from two output ports of a delay interferometer of a receiver according to the background art, and frequencies.
Figure 4:
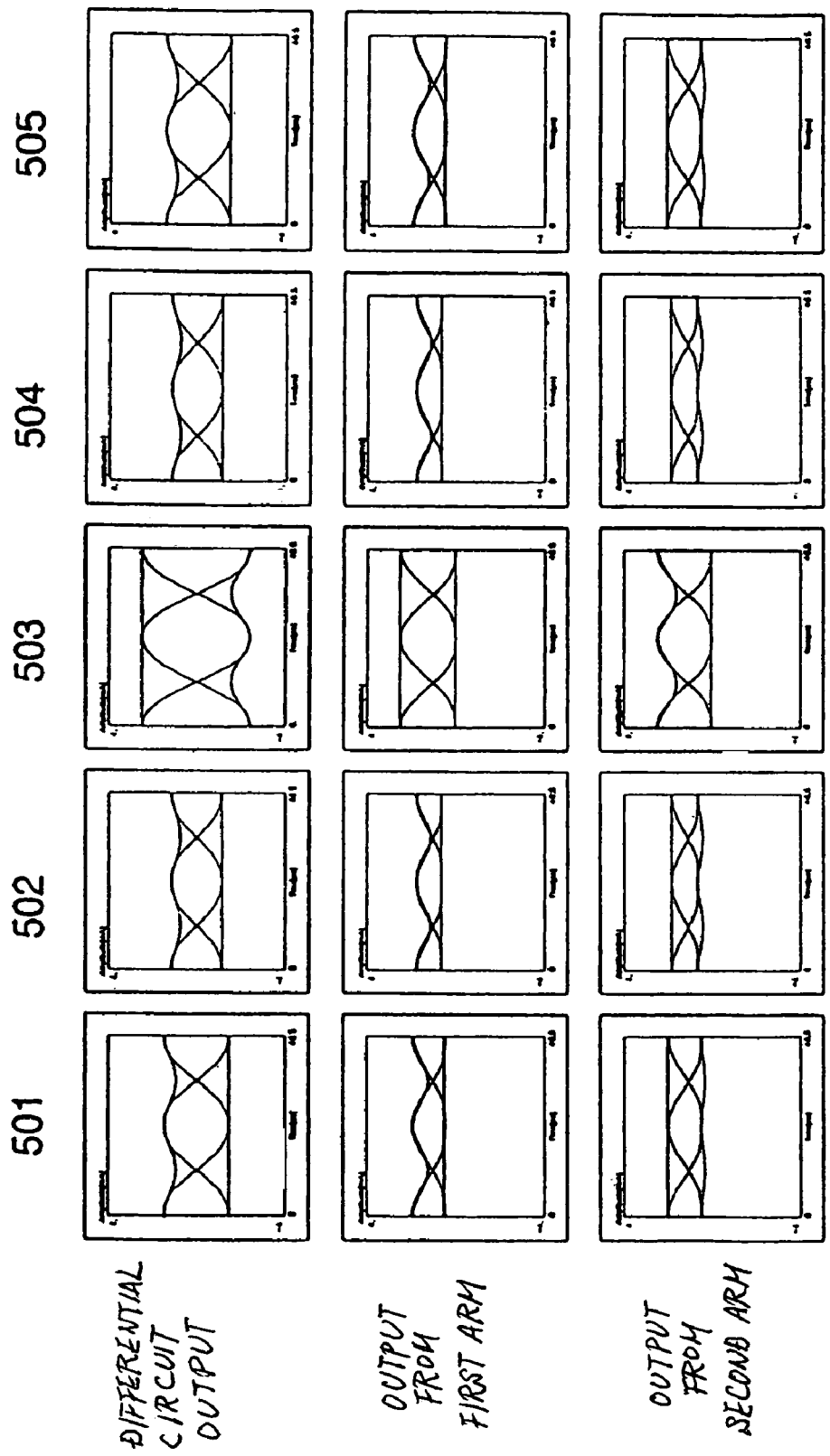
FIG. 4 is a waveform diagram showing output waveforms at the two output ports of the delay interferometer at given frequencies shown in FIG. 3 and differential circuit output waveforms representing the differences between the output waveforms.
Figure 5:
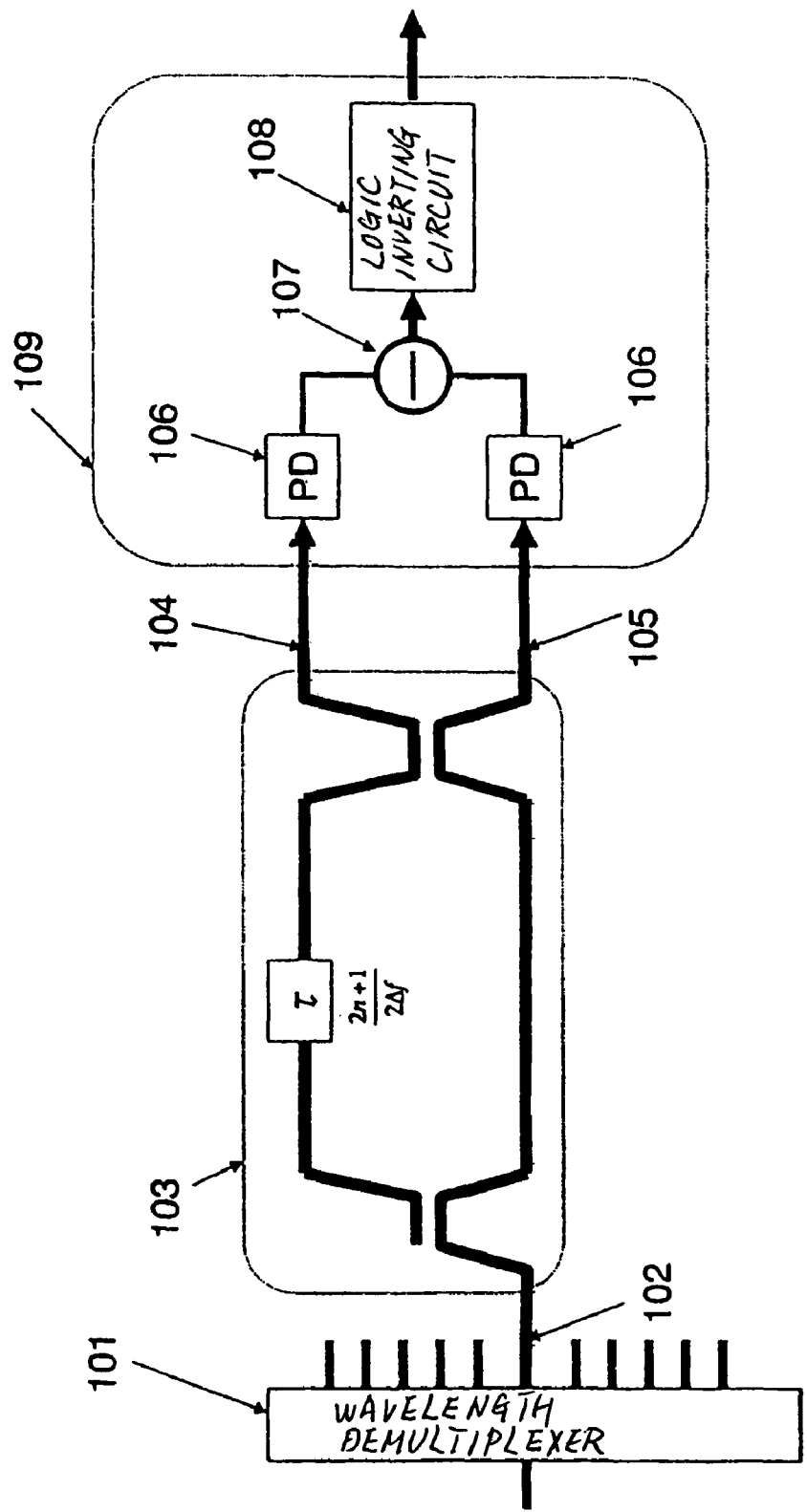
FIG. 5 is a block diagram showing a configuration of a receiver according to a first exemplary embodiment of the present invention.

FIG. 5 is a block diagram showing a configuration of a receiver according to a first exemplary embodiment of the present invention.

As shown in FIG. 5, the receiver according to the first exemplary embodiment comprises wavelength demultiplexer 101, delay interferometer 103, and light receiver 109. Light receiver 109 comprises light detectors 106, subtractor 107, and logic inverting circuit 108.

In FIG. 5, for the sake of brevity, delay interferometer 103 and light receiver 109 are connected to an output terminal of wavelength demultiplexer 101. Actually, the receiver has a plurality of delay interferometers 103 and a plurality of light receivers 109, which are connected to respective output terminals of wavelength demultiplexer 101. Delay interferometers 103 and light receivers 109 do not need to be connected to all the output terminals of wavelength demultiplexer 101. Rather, delay interferometers 103 and light receivers 109 may be connected to only output terminals of wavelength demultiplexer 101 which output central frequencies that are used in an optical communication system.

Wavelength demultiplexer 101 comprises a known arrayed waveguide grating, for example, and input port 102 of delay interferometer 103 is connected to an output terminal of wavelength demultiplexer 101.

Delay interferometer 103 comprises a Mach-Zehnder delay interferometer which comprises a quartz waveguide, for example. Delay interferometer 103 is adjusted such that the delay difference $\tau$ between two arms is expressed by $(2n+1)/(2\Delta f)$ where n represents a positive number and $\Delta f$ the interval between central frequencies of an input signal (WDM light). In other words, the interval between interferential frequencies is set to $2/(2n+1)$ times the interval between central frequencies used in the WDM process.

According to the present exemplary embodiment, it is assumed that $\Delta f=100$ GHz and the transmission rate (signal bit rate) is 43 Gbps, and delay interferometer 103 wherein n=2, $\tau=25$ ps is employed. In this case, the interval between interferential frequencies of delay interferometer 103 is 40 GHz.

Delay interferometer 103 includes first output port 104 and second output port 105 connected respectively to two light detectors 106 of light receiver 109.

Light detectors 106 comprise light-detecting elements made of InGaAs, for example, for converting light signals output from first output port 104 and second output port 105 of delay interferometer 103 into electric signals.

Subtractor 107 outputs a differential signal between output signals from two light detectors 106.

Logic inverting circuit 108 outputs an output signal from subtractor 107, with its logic level non-inverted or inverted depending on the central frequencies of the light signals demultiplexed by wavelength demultiplexer 101.

Wavelength demultiplexer 101, light detectors 106, subtractor 107, and logic inverting circuit 108 shown in FIG. 5 are of structural details well known to those skilled in the art. Since they have no direct bearing on the features of the present invention, their structural details and operational details will not be described below.

Operation of light receiver 109 shown in FIG. 5 will be described below.

A WDM light input to wavelength demultiplexer 101 is demultiplexed into signal components having central frequencies used in the WDM process, and the signal components are output from the output terminals of wavelength demultiplexer 101. The demultiplexed light signals (DPSK signals) are converted into intensity signals by delay interferometer 103.

In the receiver according to the present exemplary embodiment, the interval between the central frequencies contained in the WDM light is $\Delta f=100$ GHz and delay interferometer 103 is adjusted such that the interval between interferential frequencies is 40 GHz (=2/5 of $\Delta f=100$ GHz). Specifically, the delay difference of delay interferometer 103 is adjusted such that when a light signal having a reference frequency (e.g., frequency 401-c shown in FIG. 6) is input to delay interferometer 103, the interference light output from first output port 104 of delay interferometer 103 is maximum.

Figure 6:
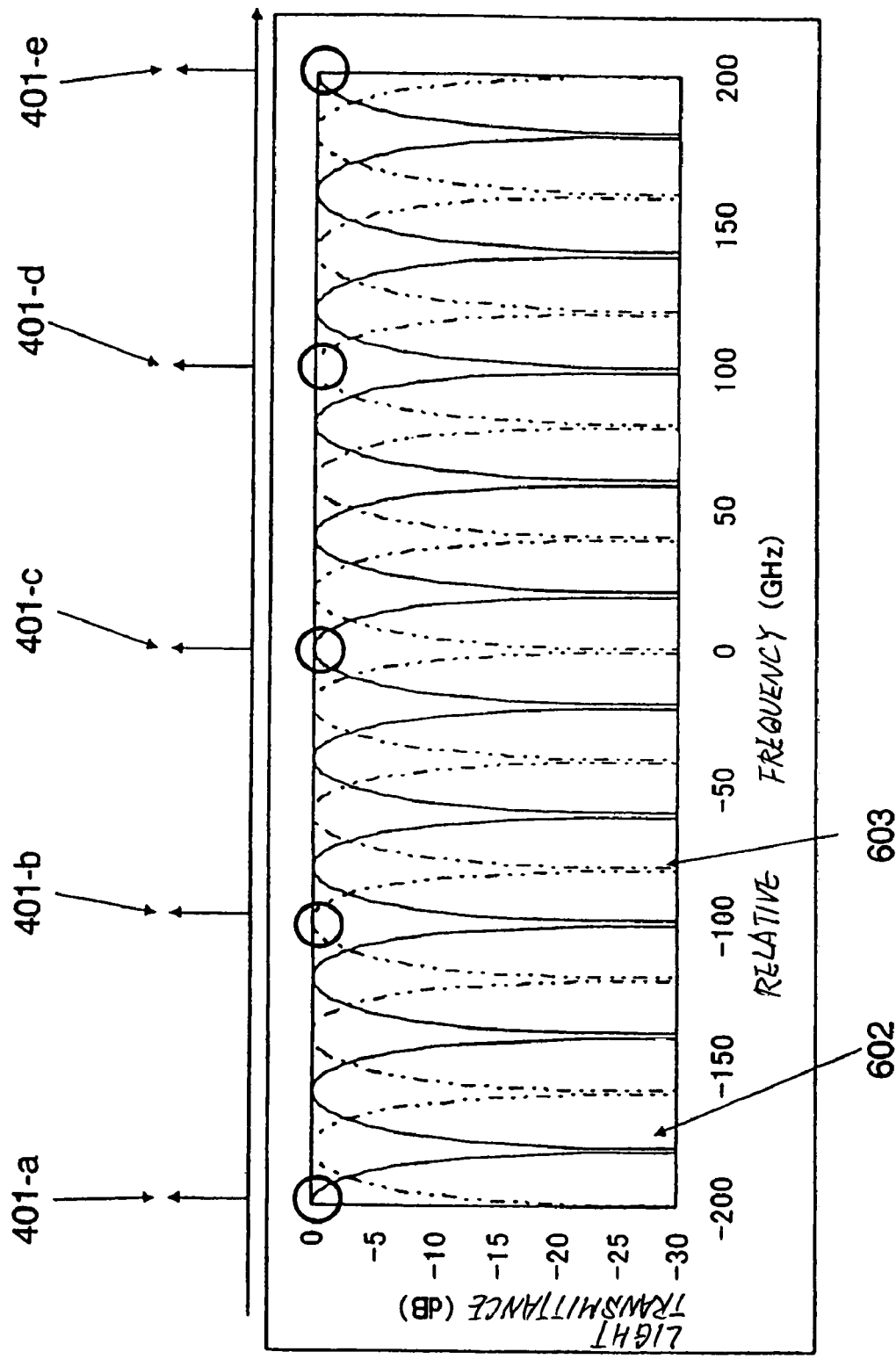
FIG. 6 is a graph showing the relationship between light intensities that are output from two output ports of a delay interferometer of the receiver according to the present invention, and frequencies.

When a light signal having frequency 401-a or r01-e shown in FIG. 6 is input to delay interferometer 103, the interference light output from first output port 104 of delay interferometer 103 is also maximum. This is because a frequency which is spaced from reference frequency 401-c by 2n+1 times (i.e., five times) the interval between interferential frequencies is in agreement with a frequency which is twice the interval between central frequencies used in the WDM process.

Figure 7:
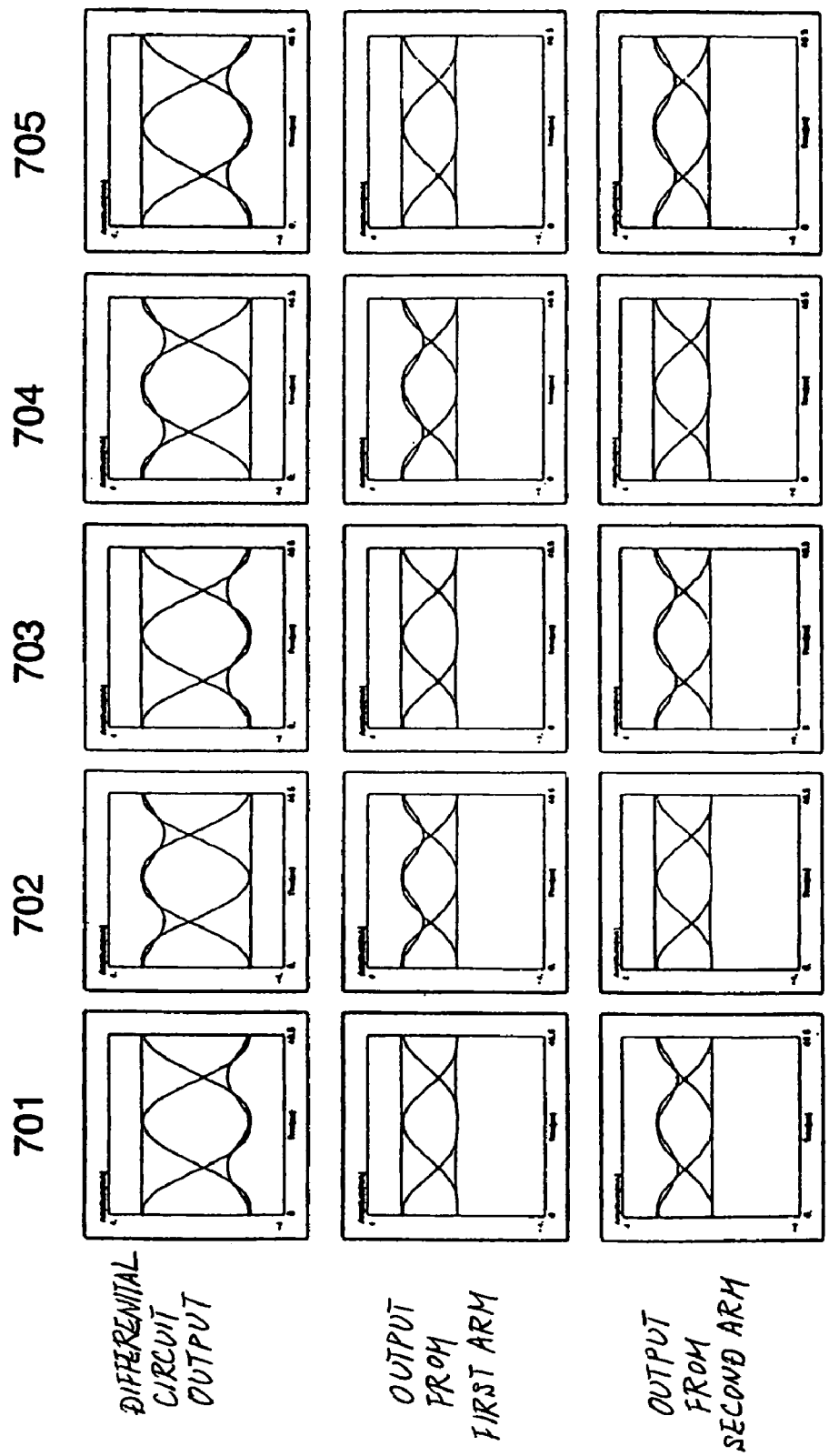
FIG. 7 is a waveform diagram showing output waveforms at the two output ports of the delay interferometer at given frequencies shown in FIG. 6 and differential circuit output waveforms representing the differences between the output waveforms.

Therefore, when a light signal having a frequency which is spaced from a reference frequency by an even multiple of the interval between central frequencies used in the WDM process is received, since a peak of the interference light is in agreement with a central frequency of the WDM light without the need for adjustment of delay interferometer 103, a proper demodulated waveform is obtained. In this case, the light waveforms output from the respective output ports of delay interferometer 103 and a differential signal (differential circuit output) therebetween are indicated as waveforms 701, 703, 705 in FIG. 7, and subtractor 107 outputs a proper demodulated signal.

When frequencies 401-b, 401-c which are spaced from the reference frequency by an odd multiple of the interval between central frequencies used in the WDM process are received, peaks of the interference light are not in agreement with central frequencies of the WDM light. At these frequencies, however, the interference light output from the first port is minimum and the interference light output from the second port is maximum, as shown in FIG. 6. This is because the interval 100 GHz between central frequencies of the WDM light is 2.5 times the interval 40 GHz between interferential frequencies, and the interval between central frequencies is spaced from the interval between interferential frequencies by two and half cyclic periods, so that the relationship between the peaks of the interference light and the extinguished light is reversed due to a shift of half cyclic period. In this case, the light waveforms output from the respective output ports of delay interferometer 103 and a differential signal (differential circuit output) therebetween are indicated as waveforms 702, 704 in FIG. 7, and a proper demodulated signal is obtained by inverting the logic level of the output signal from subtractor 107. At these frequencies, though the output port of delay interferometer 103 where the interference light is peaked is changed, since the peaks of the interference light and the interval between the central frequencies of the WDM process are in agreement with each other, the received amplitude is not reduced and the waveform distortion is not increased by inverting the code.

Whether logic inverting circuit 108 should invert the logic level of the output signal from subtractor 107 or not may be determined according to selective criteria given below.

At a central frequency serving as a reference frequency (e.g., frequency 401-c shown in FIG. 6) used in the WDM process, the delay difference between lights propagated through the two arms of delay interferometer 103 is adjusted to obtain a proper demodulated signal when the logic level from logic inverting circuit 108 is output non-inverted. When a frequency which is spaced from the reference frequency by an even multiple of the interval between central frequencies of the WDM process is received, the logic level from logic inverting circuit 108 is output non-inverted, and when a frequency which is spaced from the reference frequency by an odd multiple of the interval between central frequencies of the WDM process is received, the logic level from logic inverting circuit 108 is output inverted.

Delay interferometer 103 receives a light signal (DPSK signal) having frequency 401-a, 401-c, or 401-e, for example, shown in FIG. 6 as a central frequency. If bits of the light signal which are adjacent to each other on the temporal axis are in phase with each other, then delay interferometer 103 outputs a light from first output port 104. If bits of the light signal which are adjacent to each other on the temporal axis are in opposite phase with each other, then delay interferometer 103 outputs a light from second output port 105.

Delay interferometer 103 receives a light signal having frequency 401-b or 401-d shown in FIG. 6. If bits of the light signal which are adjacent to each other on the temporal axis are in phase with each other, then delay interferometer 103 outputs a light from second output port 105. If bits of the light signal which are adjacent to each other on the temporal axis are in opposite phase with each other, then delay interferometer 103 outputs a light from first output port 104. Accordingly, when delay interferometer 103 receives a light signal having frequency 401-b or 401-d, subtractor 107 outputs a signal having a logic level inverted from the logic level produced when delay interferometer 103 receives a light signal having frequency 401-a, 401-c, or 401-e.

The lights converted into intensity signals by delay interferometer 103 are converted by two light detectors 106 into electric signals. Subtractor 107 outputs a differential signal between those electric signals.

When a light signal (DPSK signal) having frequency 401-a, 401-c, or 401-e, for example, shown in FIG. 6 as a central frequency is received, logic inverting circuit 108 outputs the output signal from subtractor 107 without inverting its logic level.

When a light signal (DPSK signal) having frequency 401-b or 410-d shown in FIG. 6 as a central frequency is received, logic inverting circuit 108 outputs the output signal from subtractor 107 while inverting its logic level.

If the transmission rate (bit rate) of the DPSK signal is 43 Gbps, then time slot (about 23.3 ps) of one bit thereof is not in agreement with the delay difference (25 ps) between the lights propagated through the two arms of delay interferometer 103. Therefore, the amplitudes of the light signals output from delay interferometer 103 are slightly lowered and their waveforms are also slightly distorted. Since, however, their deviations are small, the DPSK signal is well converted into an intensity signal.

According to the present embodiment, in the specific example of the interval between interferential frequencies being set to 2/(2n+1) times the interval between central frequencies used in the WDM process, as described above, the interval between interferential frequencies is closest to the bit rate of the demultiplexed light signal (DPSK signal), i.e., the interval between interferential frequencies is set to 40 GHz (n=2) when Δf=100 GHz. If the interval between interferential frequencies is set by selecting n=1, 3, 4, . . . , i.e., if the interval between interferential frequencies is set to 66.7 GHz, 28.6 GHz, 22.2 GHz, . . . , then the deviation between the frequencies at which the interference lights output from delay interferometer 103 are peaked and the central frequencies used in the WDM process is increased. Accordingly, the amplitudes of the light signals output from delay interferometer 103 are reduced and their waveforms are distorted, resulting in a reduction in an ability to modulate the DPSK signal.

However, even if the interval between interferential frequencies is set by selecting n=1, 3, 4, . . . , since the deviation between the frequencies at which the interference lights output from delay interferometer 103 are peaked and the central frequencies used in the WDM process are constant, the reception capabilities at the respective central frequencies are equalized without the need for adjusting delay interferometer 103, making it possible to demodulate the DPSK signal. For preventing the demodulating ability from being lowered, however, the value of n should preferably be selected to make the interval between interferential frequencies closest to the bit rate of the DPSK signal, as described above in the present exemplary embodiment. This holds true for receivers according to subsequent exemplary embodiments.

The receiver according to the present exemplary embodiment is thus capable of demodulating the DPSK signal without the need for adjusting delay interferometer 103, by setting the interval between interferential frequencies to 2/(2n+1) times the interval between central frequencies used in the WDM process.

Consequently, it is not necessary to adjust delay interferometer 103 at each of the central frequencies used in the WDM process.

Since there is no need to adjust delay interferometer 103, no mechanism is required for adjusting delay interferometer 103. Therefore, frequency instabilities caused by an adjusting mechanism are eliminated, and the operating frequencies of delay interferometer 103 are stabilized.

As no mechanism is required for adjusting delay interferometer 103, delay interferometer 103 may be reduced in size, and hence the receiver may also be reduced in size.

2nd Exemplary Embodiment

Figure 8:
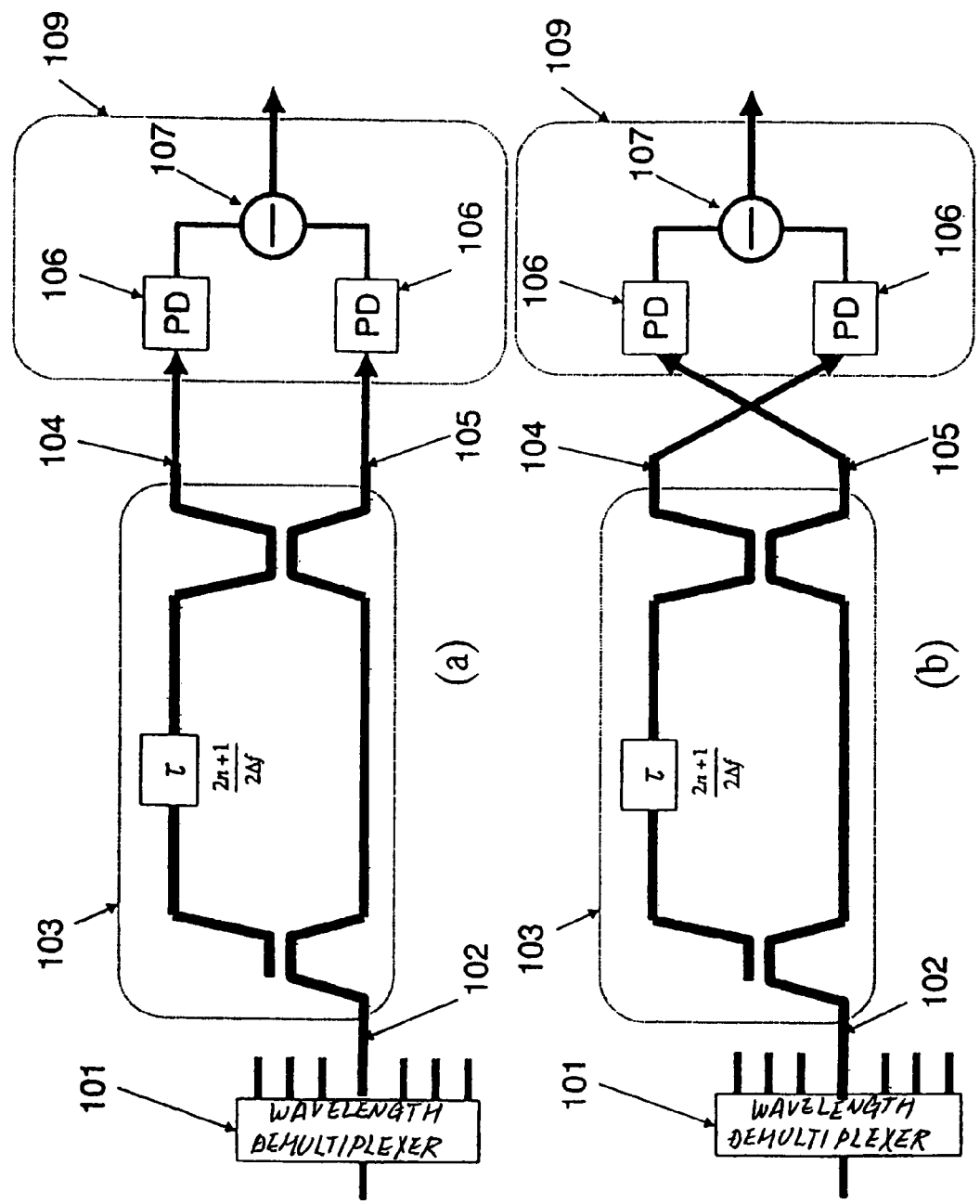
FIG. 8 is a block diagram showing a configuration arrangement of a receiver according to a second exemplary embodiment of the present invention.

FIG. 8 is a block diagram showing a configuration of a receiver according to a second exemplary embodiment of the present invention.

The receiver according to the second exemplary embodiment is arranged to change the connected relationship between the two output ports of delay interferometer 103 and two light detectors 106 of light receiver 109.

For receiving a central frequency (e.g., frequency 401-c shown in FIG. 6) serving as a reference frequency in the WDM process, the receiver according to the second exemplary embodiment is arranged such that first output port 104 and second output port 105 of delay interferometer 103 and two light detectors 106 of light receiver 109 are connected as shown in FIG. 8(a). The delay difference between lights propagated through the two arms of delay interferometer 103 is adjusted to output a proper demodulated signal from subtractor 107 through the above connections.

The connected arrangement shown in FIG. 8(a) may also be used to receive a frequency which is spaced from the reference frequency by an even multiple of the interval between central frequencies used in the WDM process.

For receiving a frequency which is spaced from the reference frequency by an odd multiple of the interval between central frequencies used in the WDM process, the receiver according to the second exemplary embodiment is arranged such that first output port 104 and second output port 105 of delay interferometer 103 and two light detectors 106 of light receiver 109 are connected as shown in FIG. 8(b), which illustrates connections inverse to those shown in FIG. 8(a).

Since the minuend and subtrahend signals input to subtractor 107 are inverted by the above connections, subtractor 107 outputs a signal whose logic level is inserted. Therefore, subtractor 107 outputs a proper demodulated signal even in the absence of logic inverting circuit 108 according to the first exemplary embodiment.

The receiver according to the present exemplary embodiment offers the same advantages as those of the receiver according to the first exemplary embodiment, and in addition is simpler in structure because it can dispense with logic inverting circuit 108.

3rd Exemplary Embodiment

Figure 9:
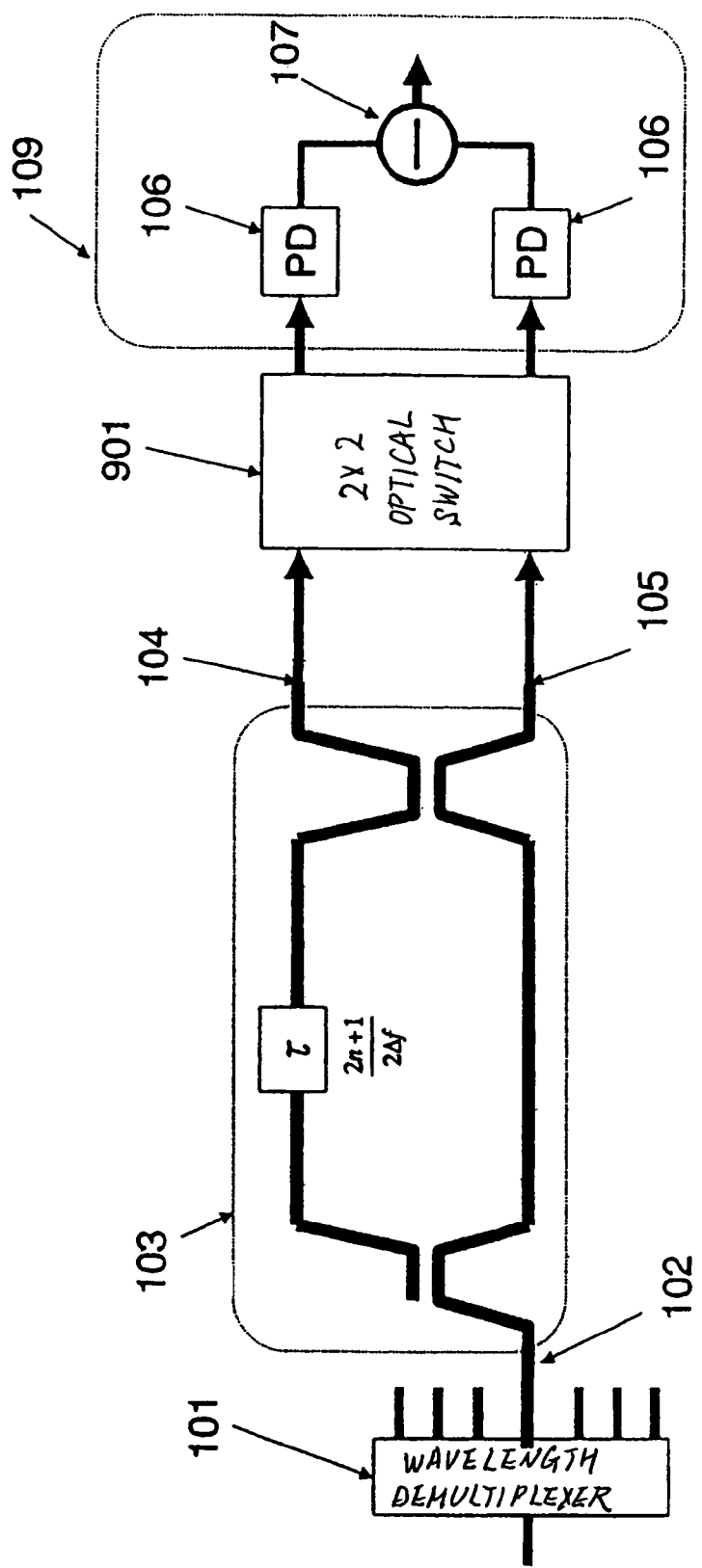
FIG. 9 is a block diagram showing a configuration of a receiver according to a third exemplary embodiment of the present invention.

FIG. 9 is a block diagram showing a configuration of a receiver according to a third exemplary embodiment of the present invention.

As shown in FIG. 9, the receiver according to the third exemplary embodiment includes 2×2 optical switch 901 connected between the output ports of delay interferometer 103 and light detectors 106, rather than selecting a connected relationship between the output ports of delay interferometer 103 and light detectors 106 depending on the frequency demultiplexed by wavelength demultiplexer 101 shown in FIG. 8.

Specifically, first output port 104 and second output port 105 of delay interferometer 103 are connected to respective two input ports of 2×2 optical switch 901, and output ports of 2×2 optical switch 901 are connected to respective light detectors 106 of light receiver 109.

As with the second exemplary embodiment, for receiving a central frequency serving as a reference frequency in the WDM process and a frequency which is spaced from the reference frequency by an even multiple of the interval between central frequencies used in the WDM process, 2×2 optical switch 901 has its settings selected such that first output port 104 and second output port 105 of delay interferometer 103 and two light detectors 106 of light receiver 109 are connected as shown in FIG. 8(a).

For receiving a frequency which is spaced from the reference frequency by an odd multiple of the interval between central frequencies used in the WDM process, 2×2 optical switch 901 has its settings selected such that first output port 104 and second output port 105 of delay interferometer 103 and two light detectors 106 of light receiver 109 are connected as shown in FIG. 8(b).

By thus connecting first output port 104 and second output port 105 of delay interferometer 103 and two light detectors 106 of light receiver 109 through 2×2 optical switch 901, the receiver can output a proper demodulated signal when it receives either one of the central frequencies.

The receiver according to the present exemplary embodiment offers the same advantages as those of the receiver according to the second exemplary embodiment, and in addition can flexibly be operated simply by changing the settings of 2×2 optical switch 901.

The settings of 2×2 optical switch 901 may be changed by any changing means. For example, the settings may be changed by the operator using a switch or the like, or the connections of 2×2 optical switch 901 may be determined from the frequency of a received light signal. The determining function may be provided in 2×2 optical switch 901 or may be provided in a controller, not shown, of the receiver. The determining function can be realized by a CPU or a DSP which performs its processing operation according to a program or an LSI circuit or the like comprising a combination of logic circuits.

4th Exemplary Embodiment

Figure 10:
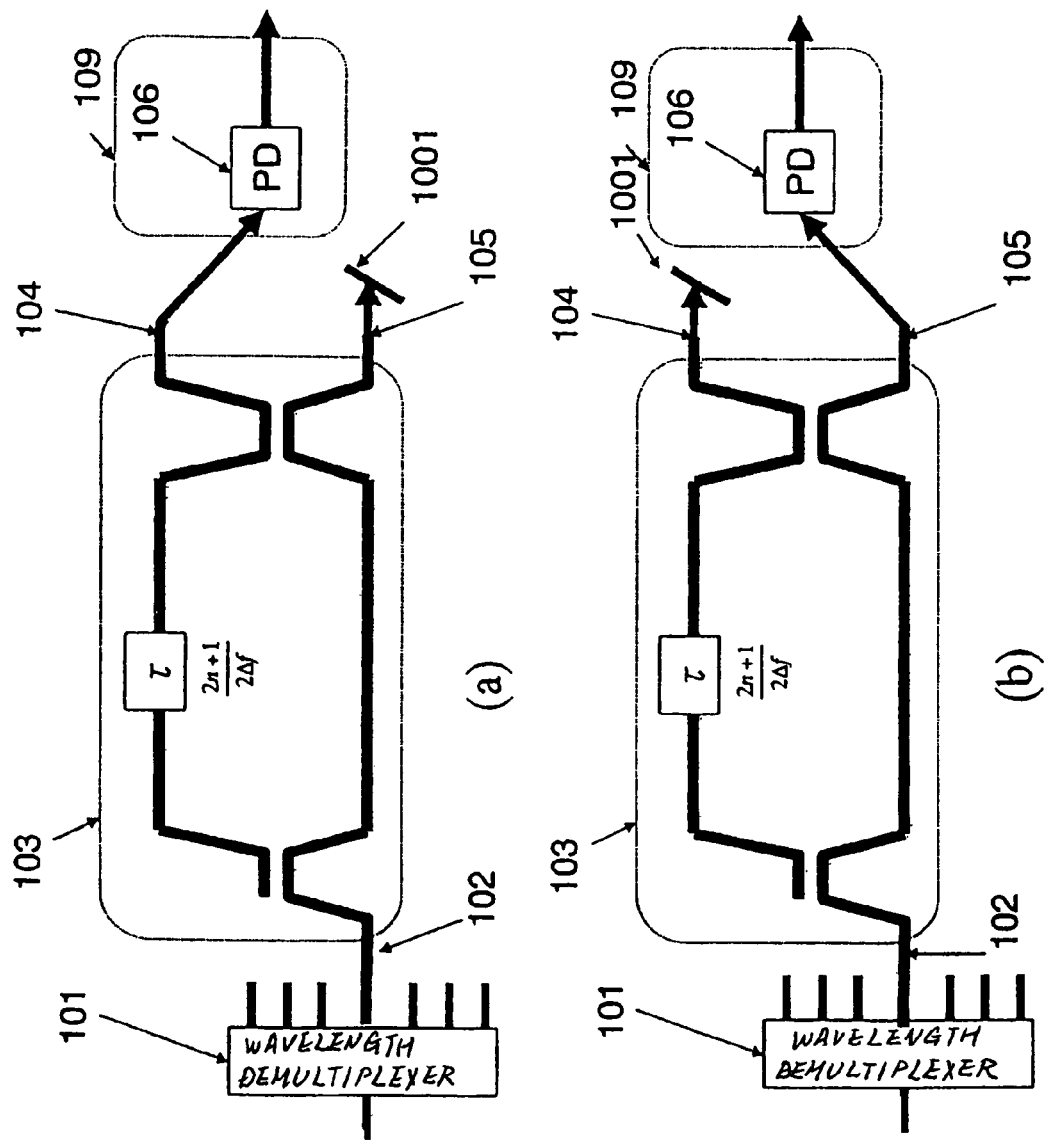
FIG. 10 is a block diagram showing a configuration of a receiver according to a fourth exemplary embodiment of the present invention.

FIG. 10 is a block diagram showing a configuration of a receiver according to a fourth exemplary embodiment of the present invention.

As shown in FIGS. 10(a), 10(b), the receiver according to the fourth exemplary embodiment is arranged such that only one output port of delay interferometer 103 is connected to light detector 106 of light receiver 109, and the output port to be used is selected depending on the frequency demultiplexed by wavelength demultiplexer 101. In FIGS. 10(a), 10(b), 1001 denotes a reflection-free optical terminator.

For receiving a central frequency (e.g., frequency 401-c shown in FIG. 6) serving as a reference frequency in the WDM process, the receiver according to the fourth exemplary embodiment is arranged such that only first output port 104 of delay interferometer 103 and light detector 106 are connected as shown in FIG. 10(*a*). The delay difference between lights propagated through the two arms of delay interferometer 103 is adjusted to output a proper demodulated signal from light detector 106 through the above connections.

The connected arrangement shown in FIG. 10(*a*) may also be used to receive a frequency which is spaced from the reference frequency by an even multiple of the interval between central frequencies used in the WDM process.

For receiving a frequency which is spaced from the reference frequency by an odd multiple of the interval between central frequencies used in the WDM process, the receiver according to the fourth exemplary embodiment is arranged such that only second output port 105 of delay interferometer 103 and light detector 106 are connected as shown in FIG. 10(*b*). With this arrangement, light detector 106 outputs a signal whose logic level is inserted.

Therefore, light detector 106 outputs a proper demodulated signal even in the absence of logic inverting circuit 108 according to the first exemplary embodiment.

The receiver according to the present exemplary embodiment offers the same advantages as those of the receiver according to the first exemplary embodiment, and in addition light receiver 109 is simpler in structure because it includes only one light detector 106.

5th Exemplary Embodiment

Figure 11:
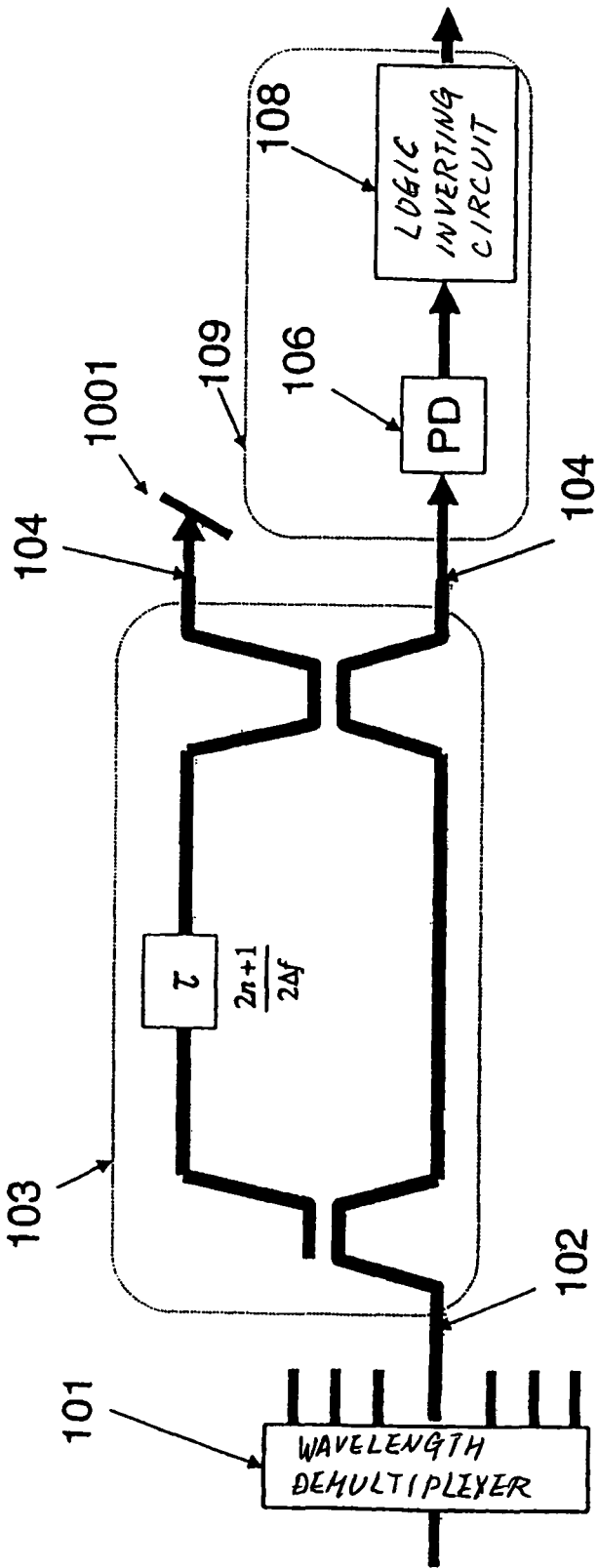
FIG. 11 is a block diagram showing a configuration of a receiver according to a fifth exemplary embodiment of the present invention.

FIG. 11 is a block diagram showing a configuration of a receiver according to a fifth exemplary embodiment of the present invention.

As shown in FIG. 11, the receiver according to the fifth exemplary embodiment is arranged such that only one output port of delay interferometer 103 is connected to light detector 106 as with the receiver according to the fourth exemplary embodiment, and the output signal from light detector 106 is output non-inverted or inverted by logic inverting circuit 108 depending on the demultiplexed frequency as with the first exemplary embodiment. In FIG. 11, logic inverting circuit 108 is added to the arrangement shown in FIG. 10(*b*). However, logic inverting circuit 108 may be added to the arrangement shown in FIG. 10(*a*).

The receiver according to the present exemplary embodiment offers the same advantages as those of the receiver according to the fourth exemplary embodiment, and in addition can flexibly be operated at different frequencies simply by changing the operation of logic inverting circuit 108.

The operation of logic inverting circuit 108 may be changed by any changing means. For example, the operation of logic inverting circuit 108 may be changed by the operator using a switch or the like, or the operation of logic inverting circuit 108 may be determined from the frequency of a received light signal. The determining function may be provided in logic inverting circuit 108 or may be provided in a controller, not shown, of the receiver. The determining function can be realized by a CPU or a DSP which performs its processing operation according to a program or an LSI circuit or the like comprising a combination of logic circuits.

6th Exemplary Embodiment

Figure 12:
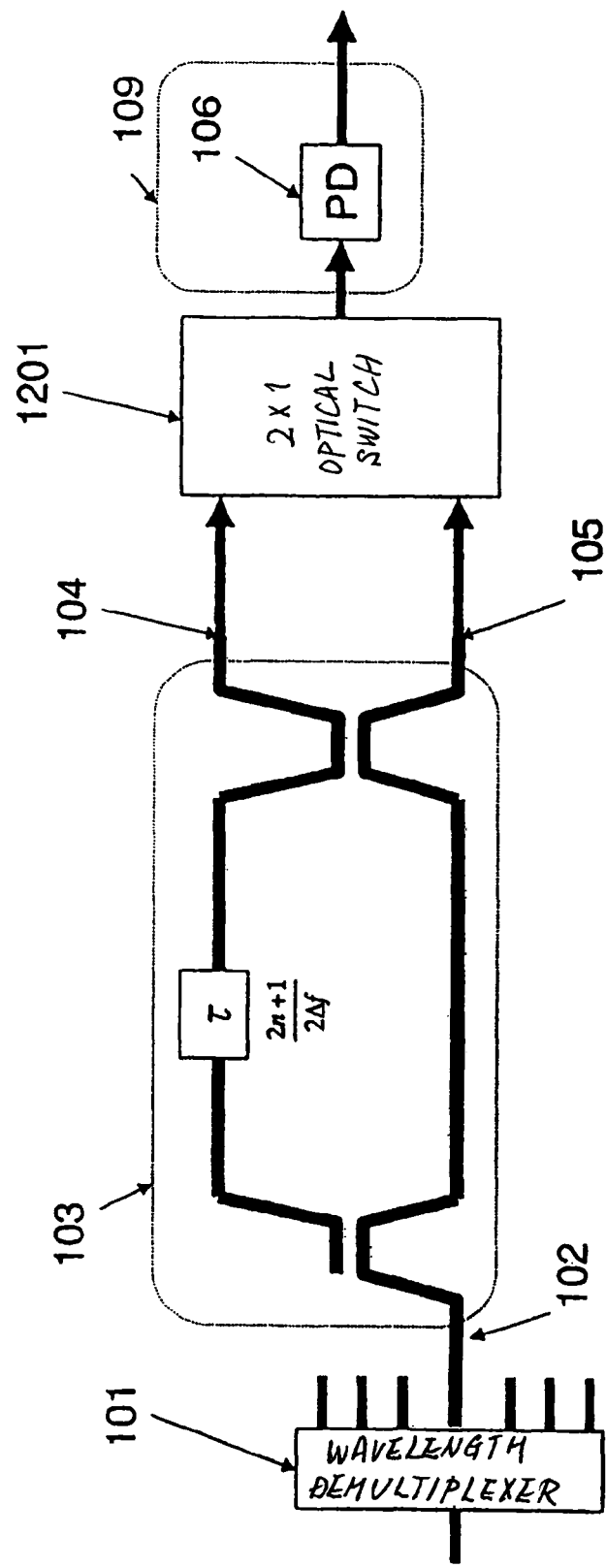
FIG. 12 is a block diagram showing a configuration of a receiver according to a sixth exemplary embodiment of the present invention.

FIG. 12 is a block diagram showing a configuration of a receiver according to a sixth exemplary embodiment of the present invention.

As shown in FIG. 12, the receiver according to the sixth exemplary embodiment is arranged such that light receiver 109 has one light detector 106 as with the fourth exemplary embodiment and fifth exemplary embodiment, and 2×1 optical switch 1201 is connected between the two output ports of delay interferometer 103 and light detector 106.

2×1 optical switch 1201 connects either one of first output port 104 and second output port 105 of delay interferometer 103 to light detector 106 depending on the frequency demultiplexed by wavelength demultiplexer 101.

The receiver according to the present exemplary embodiment offers the same advantages as those of the receiver according to the fourth exemplary embodiment, and in addition can flexibly be operated at different frequencies simply by changing the settings of 2×1 optical switch 1201.

As with the third exemplary embodiment, the settings of 2×1 optical switch 1201 may be changed by any changing means. For example, the settings may be changed by the operator using a switch or the like, or the connections of 2×1 optical switch 1201 may be determined from the frequency of a received light signal. The determining function may be provided in 2×1 optical switch 1201 or may be provided in a controller, not shown, of the receiver. The determining function can be realized by a CPU or a DSP which performs its processing operation according to a program or an LSI circuit or the like comprising a combination of logic circuits.

7th Exemplary Embodiment

Figure 13:
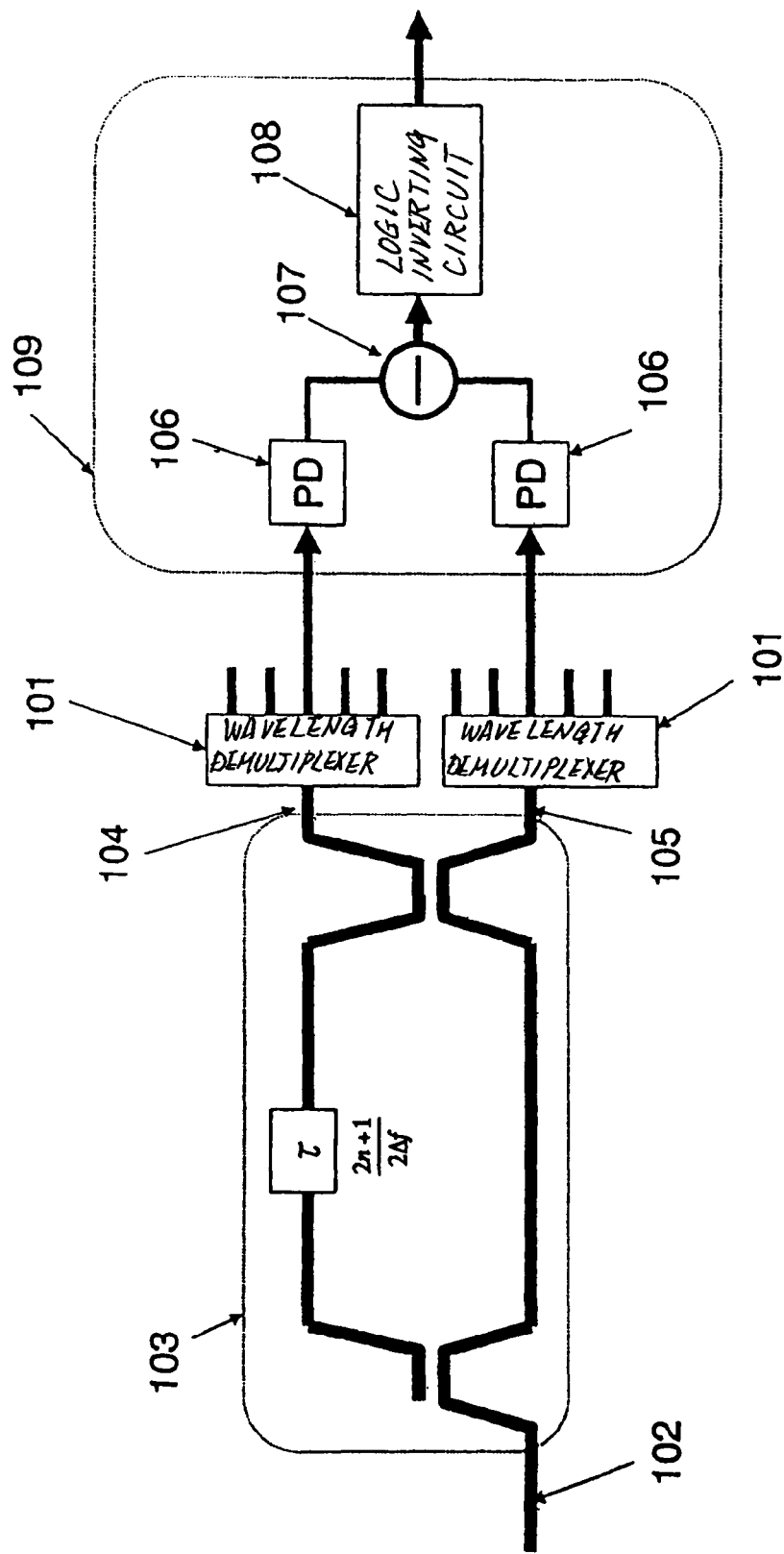
FIG. 13 is a block diagram showing a configuration of a receiver according to a seventh exemplary embodiment of the present invention.

FIG. 13 is a block diagram showing a configuration of a receiver according to a seventh exemplary embodiment of the present invention.

The receiver according to the seventh exemplary embodiment is arranged such that delay interferometer 103 receives a WDM light and converts it into intensity signals, and all light signals at intermediate frequencies which are contained in the WDM light received by delay interferometer 103 are modulated altogether.

As shown in FIG. 13, the received WDM light is input from input port 102 of delay interferometer 103, and is converted into intensity signals which are output from first output port 104 and second output port 105. The intensity signals output from first output port 104 and second output port 105 are demultiplexed by respective wavelength demultiplexers 101 into light signals at intermediate frequencies according to the WDM process.

The light signals demultiplexed by two wavelength demultiplexers 101 are input to light detectors 106, which convert them into electric signals. Subtractor 107 outputs a differential signal between those electric signals. The signal output from subtractor 107 is output non-inverted or inverted in logic level by logic inverting circuit 108.

In delay interferometer 103 according to the present interferometer, the delay difference between the lights propagated through the two arms is adjusted to peak the interference light at frequency intervals that are ⅔ of the interval between central frequencies in the WDM process. The delay difference thus adjusted makes it possible for delay interferometer 103 to appropriately demodulate all light signals at intermediate frequencies which are contained in the received WDM light.

In FIG. 13, for the sake of brevity, one light receiver 109 is shown as being connected to certain output terminals of two wavelength demultiplexers 101. Actually, however, the receiver has a plurality of light receivers 109, and each of light receivers 109 is connected to corresponding output terminals of two wavelength demultiplexers 101. Light receivers 109 do not need to be connected all the output terminals of wavelength demultiplexers 101, but may be connected to only output terminals of wavelength demultiplexers 101 for outputting central frequencies to be used in an optical communication system.

The arrangement shown in FIG. 13 is also applicable to the receivers according to the second through sixth embodiments shown in FIGS. 8 through 12.

Figure 14:
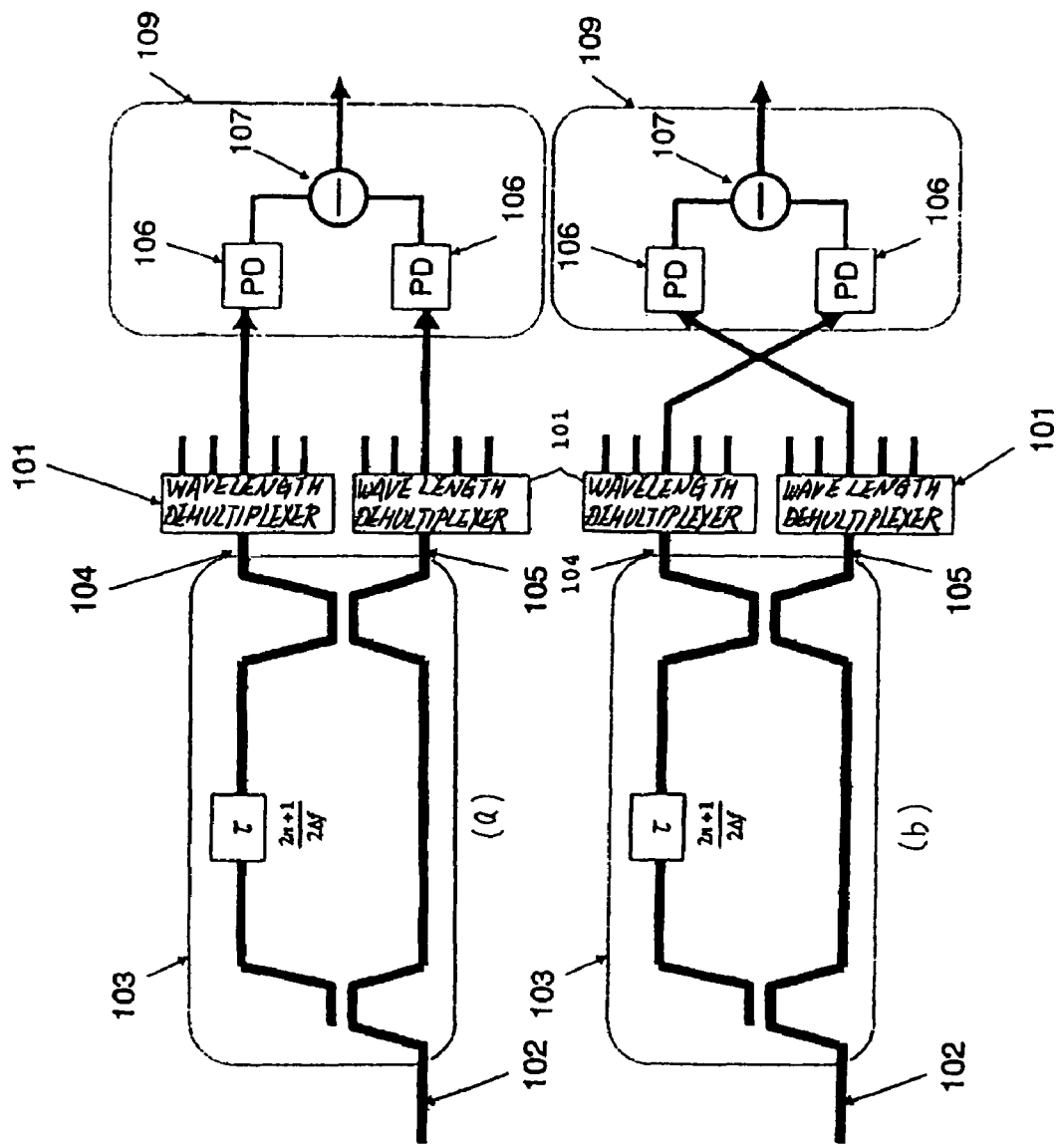
FIG. 14 is a block diagram of the receiver shown in FIG. 8 to which the seventh exemplary embodiment is applied.
Figure 15:
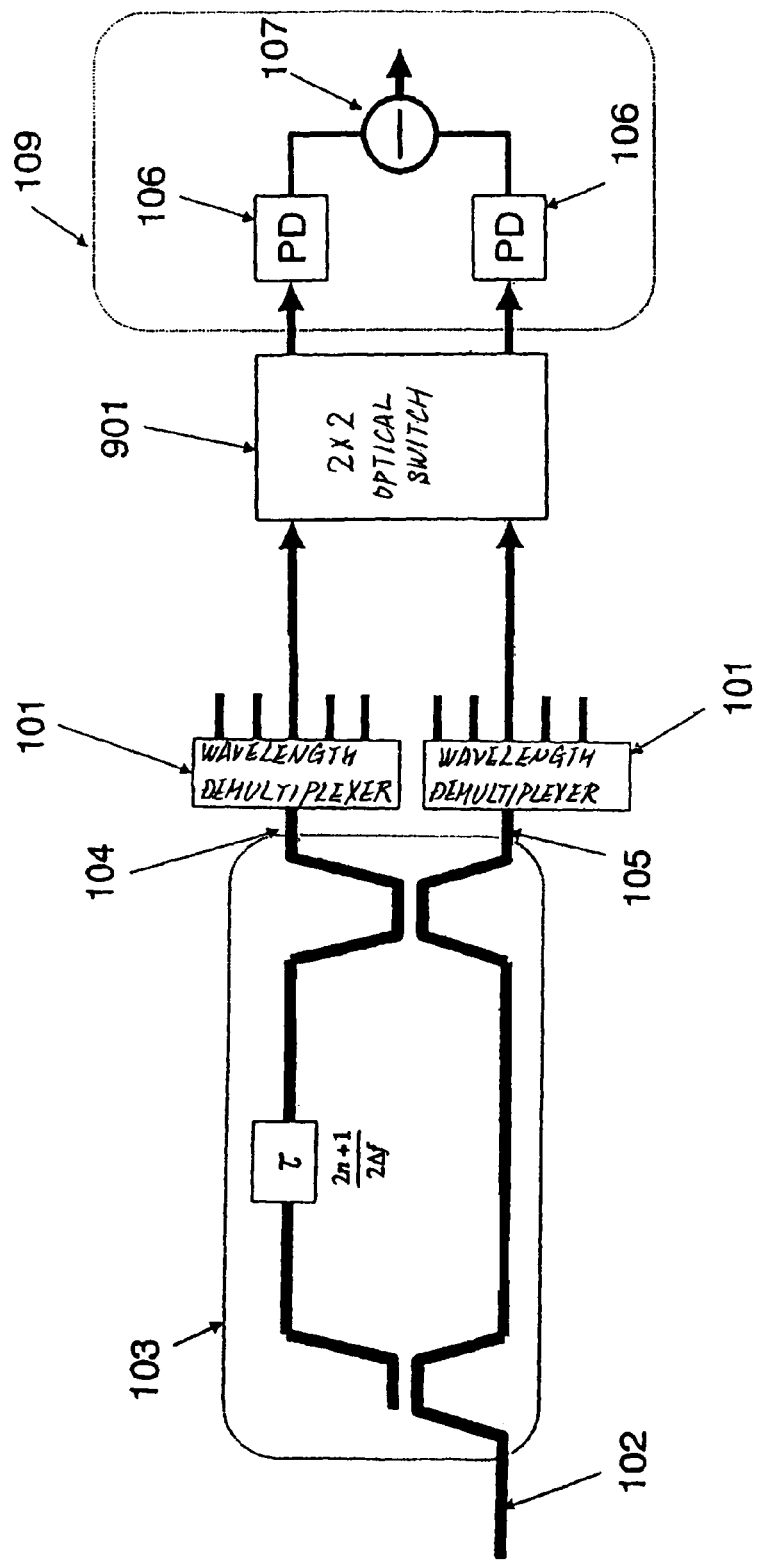
FIG. 15 is a block diagram of the receiver shown in FIG. 9 to which the seventh exemplary embodiment is applied.
Figure 16:
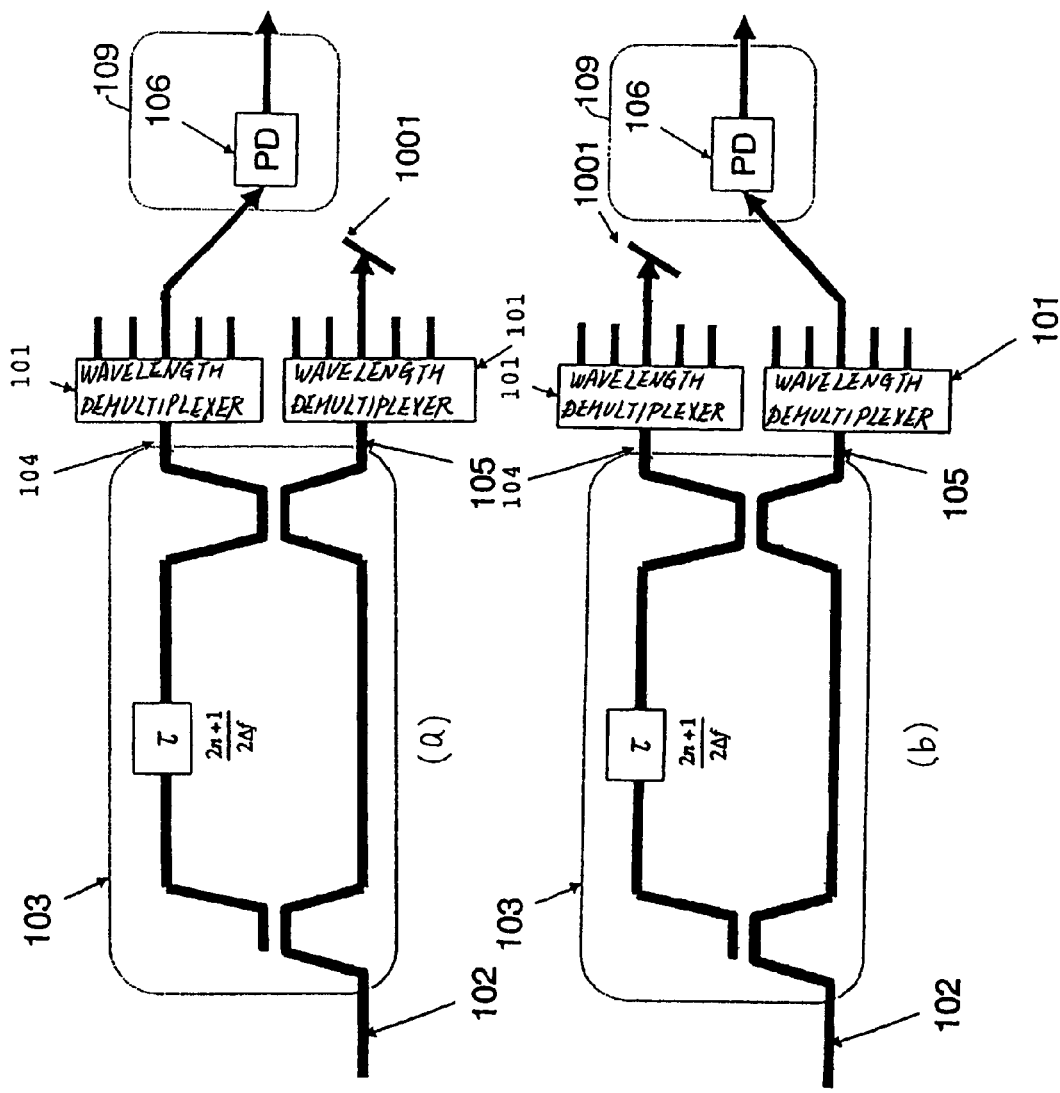
FIG. 16 is a block diagram of the receiver shown in FIG. 10 to which the seventh exemplary embodiment is applied.
Figure 17:
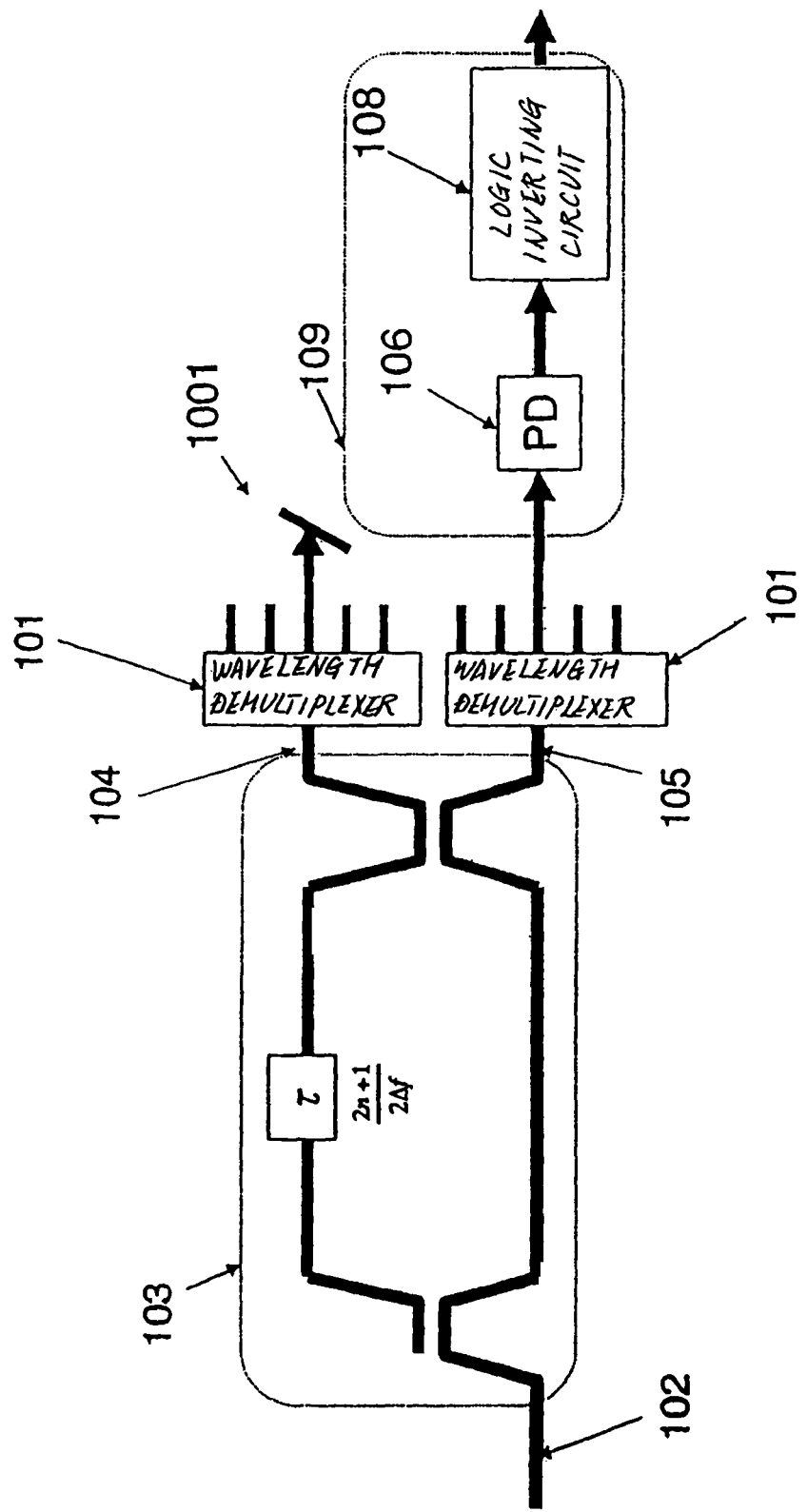
FIG. 17 is a block diagram of the receiver shown in FIG. 11 to which the seventh exemplary embodiment is applied.
Figure 18:
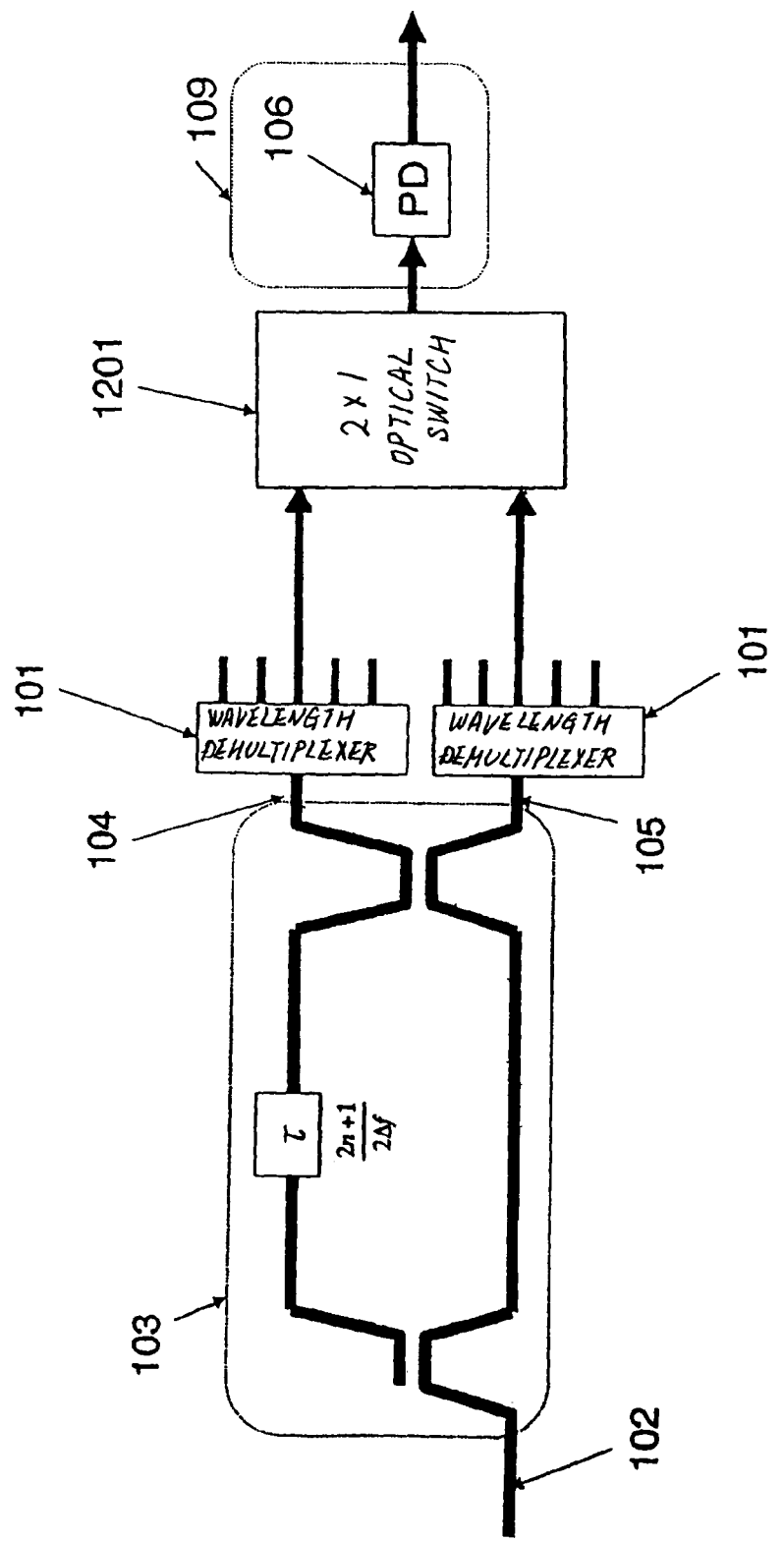
FIG. 18 is a block diagram of the receiver shown in FIG. 12 to which the seventh exemplary embodiment is applied.

FIG. 14 is a block diagram of the receiver shown in FIG. 8 to which the seventh exemplary embodiment is applied, FIG. 15 is a block diagram of the receiver shown in FIG. 9 to which the seventh exemplary embodiment is applied, and FIG. 16 is a block diagram of the receiver shown in FIG. 10 to which the seventh exemplary embodiment is applied. FIG. 17 is a block diagram of the receiver shown in FIG. 11 to which the seventh exemplary embodiment is applied, and FIG. 18 is a block diagram of the receiver shown in FIG. 12 to which the seventh exemplary embodiment is applied.

The receiver according to the present exemplary embodiment offers the same advantages as those of the receiver according to the first exemplary embodiment, and in addition is simpler in structure because it may include only one delay interferometer 103.

8th Exemplary Embodiment

Optical communication systems according to an eighth exemplary embodiment of the present invention will be described below.

Figure 19:
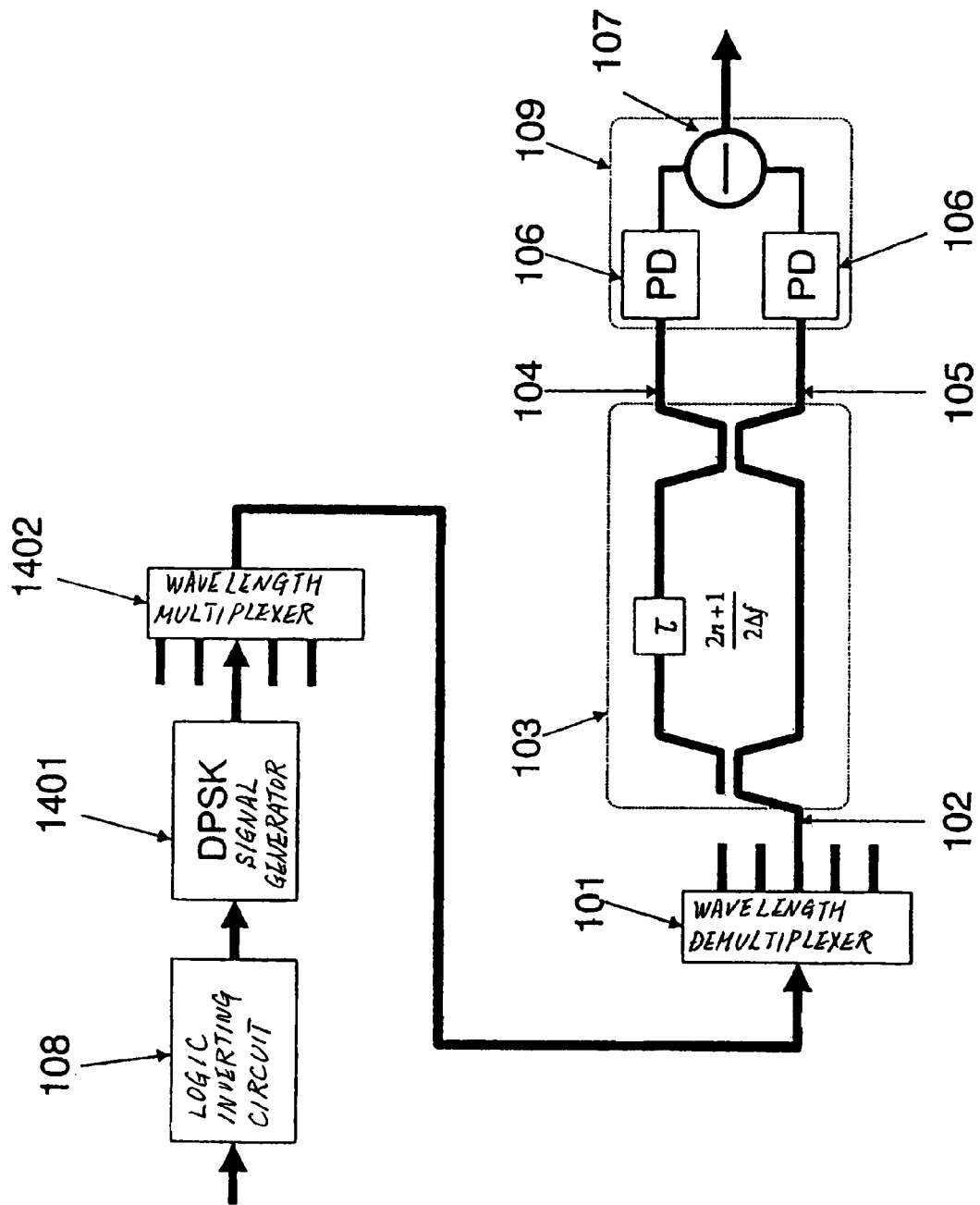
FIG. 19 is a block diagram showing a configurational example of an optical communication system according to the present invention.
Figure 20:
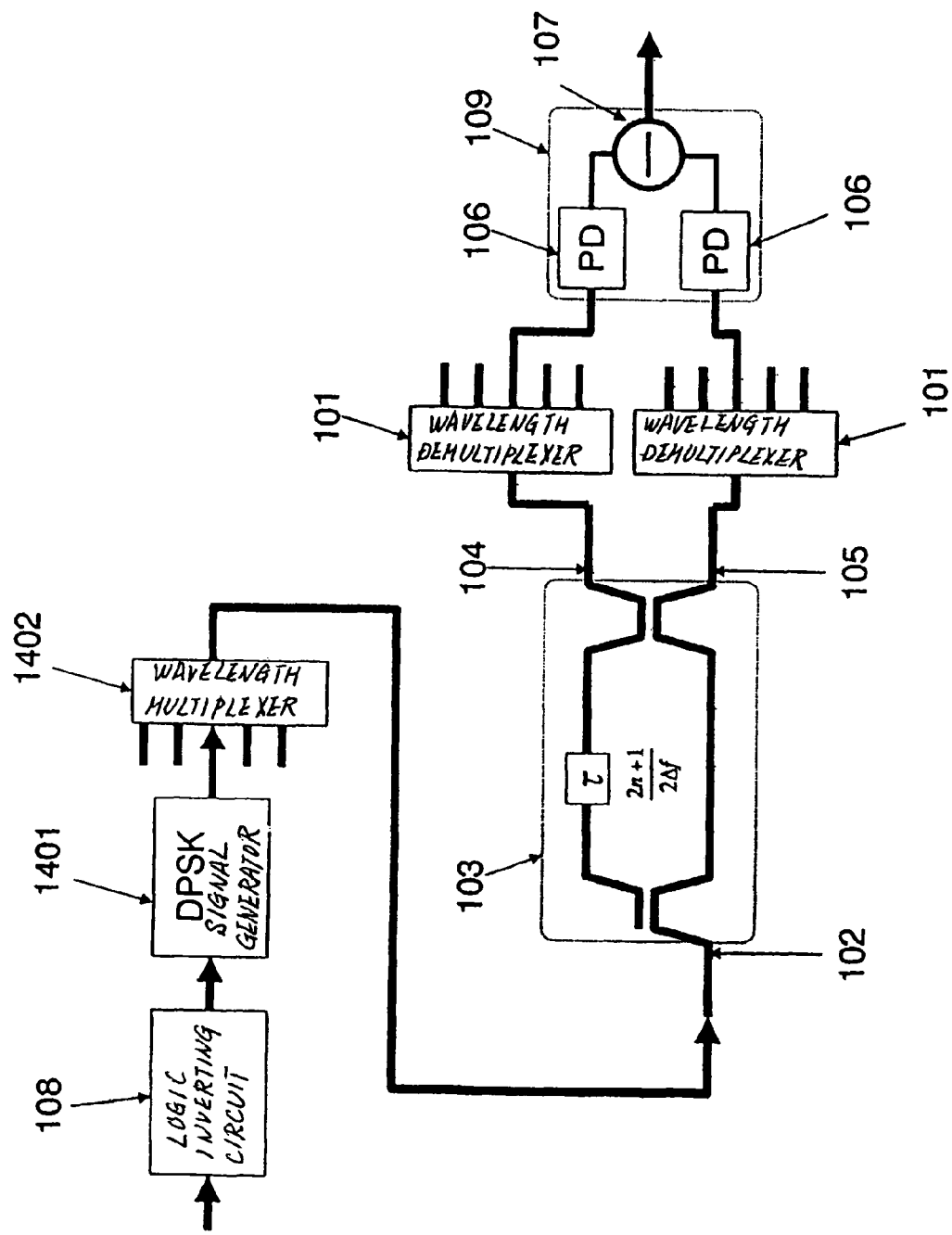
FIG. 20 is a block diagram showing another configurational example of an optical communication system according to the present invention.

FIG. 19 is a block diagram showing a configurational example of an optical communication system according to the present invention, and FIG. 20 is a block diagram showing another configurational example of an optical communication system according to the present invention.

As shown in FIG. 19, the optical communication system according to the present invention comprises a transmitter including logic inverting circuit 108 for selectively non-inverting or inverting "1" or "0" of transmission data. DPSK signal generator 1401 converts a light signal corresponding to the output signal from logic inverting circuit 108 into a DPSK signal.

The transmitter includes a plurality of DPSK signal generators 1401 for outputting DPSK signals at different frequencies, with the interval between central frequencies being N times 100 GHz, for example.

Wavelength multiplexer 1402 multiplexes the DPSK signals generated by DPSK signal generators 1401 into a WDM light, which is sent to a transmission path.

The optical communication system comprises a receiver including wavelength demultiplexer 101 for demultiplexing the received WDM light into components at the central frequencies. A demultiplexed light signal is input though input port 102 to delay interferometer 103, which converts the light signal into an intensity signal.

Intensity signals outputs from first output port 104 and second output port 105 of delay interferometer 103 are converted by light detectors 106 into electric signals. The output signals from light detectors 106 are converted by subtractor 107 into a differential signal, which is output.

In the optical communication system according to the present exemplary embodiment, as described above, the logic level is inverted in the transmitter, rather than in the receiver as illustrated in the first exemplary embodiment.

Specifically, if delay interferometer 103 is adjusted to produce a proper demodulated signal from subtractor 107 when a central frequency (e.g., frequency 401-c shown in FIG. 6) serving as a reference frequency in the WDM process is received, then the transmission data are sent non-inverted when using a frequency which is spaced from the reference frequency by an even multiple of the interval between central frequencies, and the transmission data are sent inverted when using a frequency which is spaced from the reference frequency by an odd multiple of the interval between central frequencies.

With the optical communication system according to the present exemplary embodiment, the receiver is simpler in structure because there is no need to invert and non-invert the logic level depending on the demultiplexed central frequencies.

In the receiver shown in FIG. 19, after the WDM light is demultiplexed into components at central frequencies by wavelength demultiplexer 101, each light signal is converted into an intensity signal by delay interferometer 103. However, as shown in FIG. 20, the received WDM light may be converted into an intensity signal by delay interferometer 103, and the output signal from delay interferometer 103 may be demultiplexed into light signals at central frequencies by wavelength demultiplexer 101. The receiver thus arranged is simpler in structure because it is not required to invert/non-invert the logic level depending on the frequencies and it includes only one delay interferometer 103.

Figure 21:
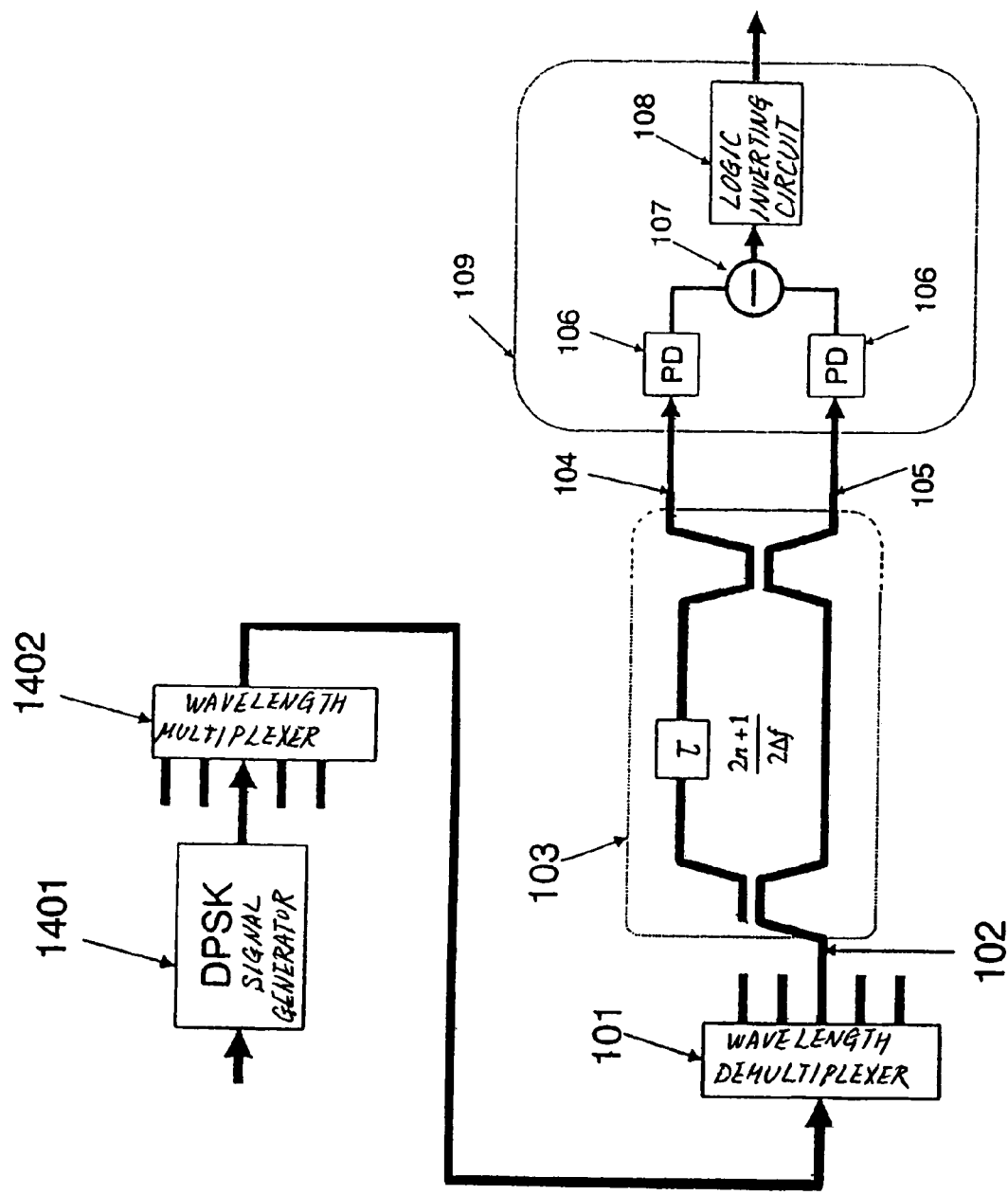
FIG. 21 is a block diagram showing a configurational example wherein a logic inverting circuit of the optical communication system shown in FIG. 19 is added to a receiver.
Figure 22:
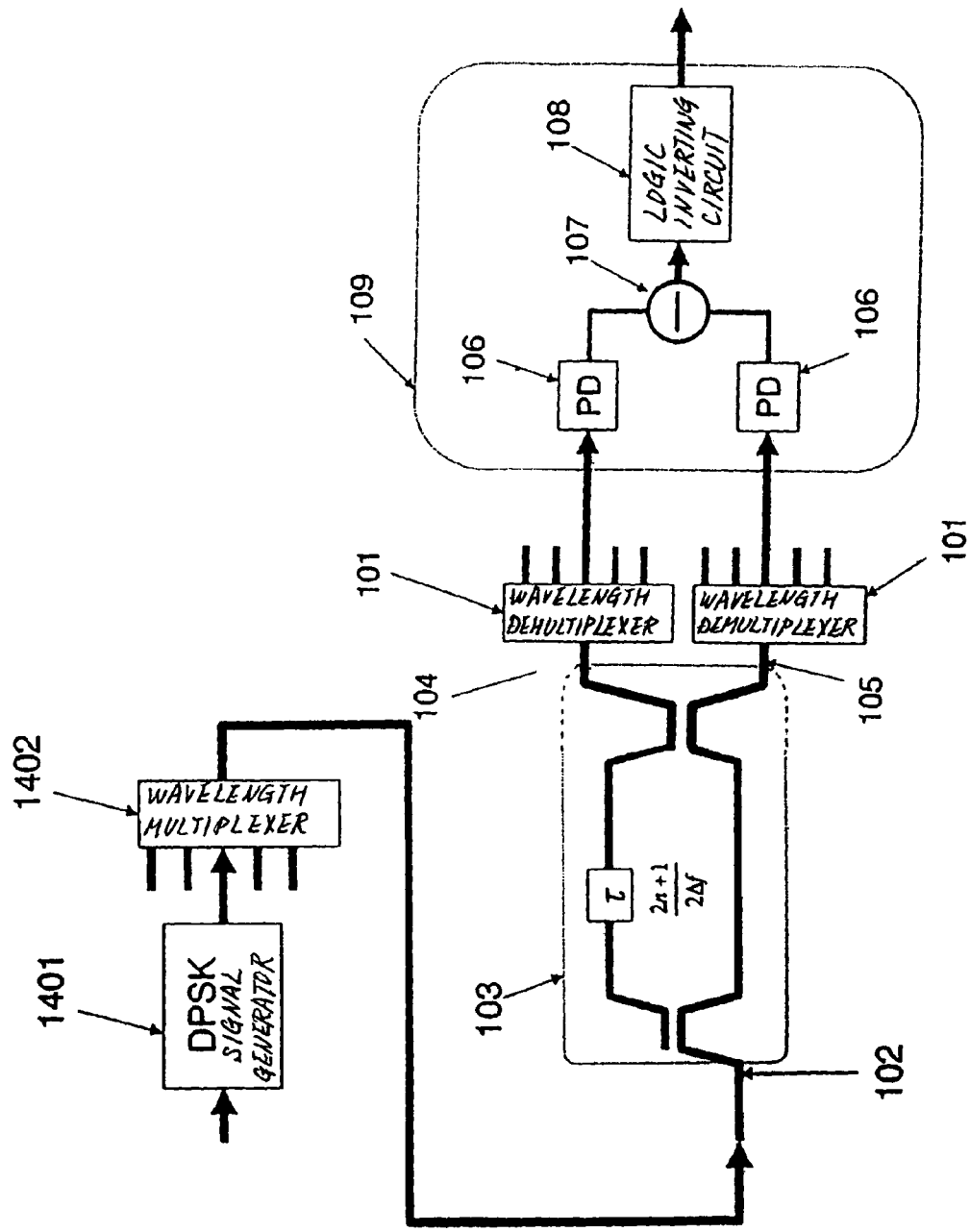
FIG. 22 is a block diagram showing a configurational example wherein a logic inverting circuit of the optical communication system shown in FIG. 20 is added to a receiver.

The optical communication systems shown in FIGS. 19 and 20 have logic inverting circuit 108 in the transmitter for selectively non-inverting or inverting the transmission data. However, an optical communication system according to the present invention may not have logic inverting circuit 108 in the transmitter. For example, the receiver may have the arrangement according to the first exemplary embodiment as shown in FIG. 21 or may have the arrangement according to the seventh exemplary embodiment as shown in FIG. 22. If there is no logic inverting circuit 108 in the transmitter, then the receiver may have the arrangement according to each of the second through sixth exemplary embodiments.

Figure 23:
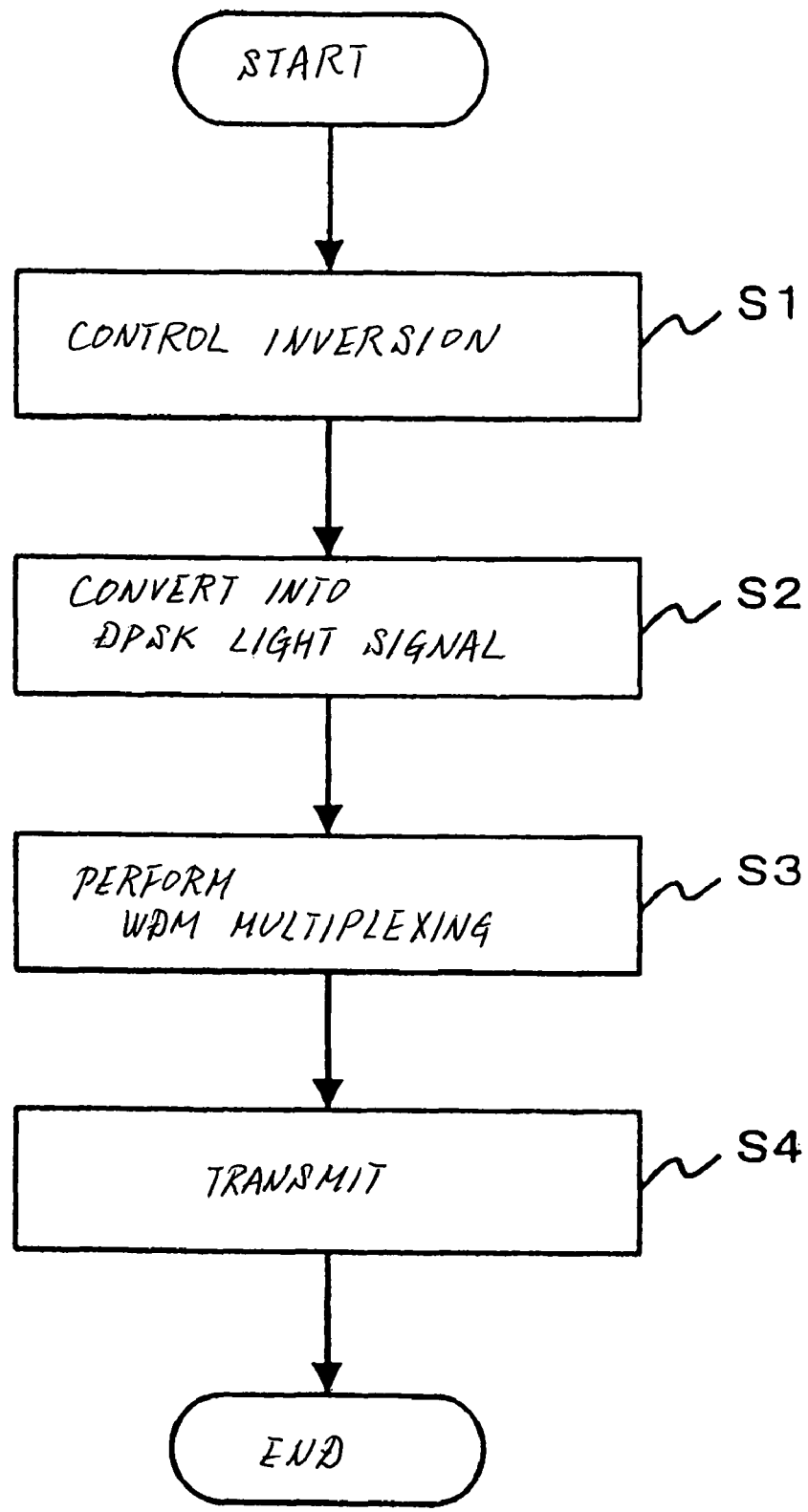
FIG. 23 is a flowchart showing an operation sequence of a transmitter of the optical communication systems shown in FIGS. 19, 20.

FIG. 23 is a flowchart showing an operation sequence of the transmitter of the optical communication systems shown in FIGS. 19, 20.

As shown in FIG. 23, logic inverting circuit 108 selectively inverts or non-inverts transmission data (step S1), and DPSK signal generator 140 converts a light signal corresponding to the output signal from logic inverting circuit 108 into a DPSK signal (step S2).

Since the transmitter has a plurality of DPSK signal generators 140, wavelength multiplexer 1402 multiplexes DPSK signals generated by DPSK signal generators 140 (step S3), and sends the multiplex signal to the transmission path (step S4).

Figure 24:
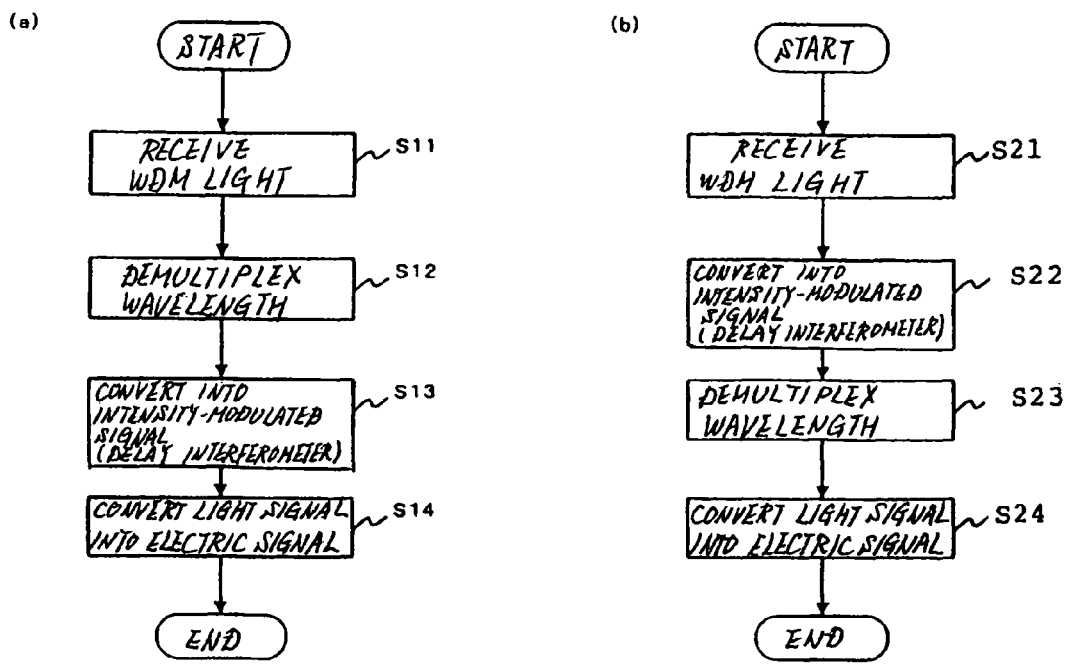
FIG. 24 is a flowchart showing an operation sequence of a light receiver of the optical communication systems shown in FIGS. 19 through 22.

FIG. 24 is a flowchart showing an operation sequence of the light receiver of the optical communication systems shown in FIGS. 19 through 22. FIG. 24(a) illustrates an operation sequence of the optical communication systems shown in FIGS. 19 and 21, and FIG. 24(b) illustrates an operation sequence of the optical communication systems shown in FIGS. 20 and 22.

As shown in FIG. 24(a), the light receiver shown in FIGS. 19 and 21 receives a WDM light in step S11, and wavelength demultiplexer 101 demultiplexes the received WDM light into signal components at respective central frequencies (step S12).

A demultiplexed light signal is converted into an intensity signal by delay interferometer 103 (step S13).

The intensity signal output from delay interferometer 103 is converted into an electric signal by light detector 106 (step S14). The output signal from light detector 106 is converted by subtractor 107 into a differential signal, which is output.

If the receiver includes logic inverting circuit 108 shown in FIG. 21, then the output signal from subtractor 107 is output non-converted or converted depending on the central frequency by logic inverting circuit 108, for example. In this example, the logic level of the output signal from subtractor 107 is changed by logic inverting circuit 108. However, as described with respect to the second through seventh exemplary embodiments, the logic level of the output signal from subtractor 107 may be changed depending on the central frequency by the connected relationship between delay interferometer 103 or wavelength demultiplexer 101 and light detector 106 or the optical switch.

As shown in FIG. 24(b), the light receiver shown in FIGS. 20 and 22 receives a WDM light in step S21, and delay interferometer 103 converts the received WDM light into an intensity signal (step S22).

The intensity signal output from delay interferometer 103 is demultiplexed by wavelength demultiplexer 101 into signal components at respective central frequencies (step S23).

An intensity-modulated signal output from wavelength demultiplexer 101 is converted into an electric signal by light detector 106 (step S24). The output signal from light detector 106 is converted by subtractor 107 into a differential signal, which is output.

If the receiver includes logic inverting circuit 108 shown in FIG. 22, then the output signal from subtractor 107 is output non-converted or converted depending on the central frequency by logic inverting circuit 108, for example. In this example, the logic level of the output signal from subtractor 107 is changed by logic inverting circuit 108. However, as described with respect to the second through seventh exemplary embodiments, the logic level of the output signal from subtractor 107 may be changed depending on the central frequency by the connected relationship between delay interferometer 103 or wavelength demultiplexer 101 and light detector 106 or the optical switch.

The invention claimed is:

1. A receiver for use in a system for transmitting a WDM light produced by multiplexing a plurality of DPSK-modulated light signals, comprising:
    a wavelength demultiplexer for demultiplexing said WDM light into light signals at respective central frequencies thereof;
    a delay interferometer for converting a light signal output from said wavelength demultiplexer into an intensity signal;
    a light detector for converting said intensity signal into an electric signal; and
    a logic inverting circuit for outputting the output signal from said light detector while non-inverting or inverting the logic level thereof depending on the frequency of a light signal output from said wavelength demultiplexer;
    wherein the interval between interferential frequencies at which the output signal output from said delay interferometer is maximum is 2/(2n+1) times the interval between the central frequencies of said WDM light, where n represents a positive number.

2. A receiver for use in a system for transmitting a WDM light produced by multiplexing a plurality of DPSK-modulated light signals, comprising:
    a wavelength demultiplexer for demultiplexing said WDM light into light signals at respective central frequencies thereof;
    a delay interferometer for converting a light signal output from said wavelength demultiplexer into an intensity signal and outputting the intensity signal, said delay interferometer including an input port for being supplied with said light signal and a first output port and a second output port for outputting said intensity signal; and
    a first light detector and a second light detector for converting said intensity signal into an electric signal, said first and second light detectors being differently connected to said first output port and said second output port of said delay interferometer depending on the frequency of a light signal output from said wavelength demultiplexer;
    wherein the interval between interferential frequencies at which the output signal output from said delay interferometer is maximum is 2/(2n+1) times the interval between the central frequencies of said WDM light, where n represents a positive number.

3. The receiver according to claim 2, further comprising an optical switch for changing connections between said first output port and said second output port of said delay interferometer and said first light detector and said second receiver depending on the frequency of a light signal output from said wavelength demultiplexer.

4. A receiver for use in a system for transmitting a WDM light produced by multiplexing a plurality of DPSK-modulated light signals, comprising:
    a wavelength demultiplexer for demultiplexing said WDM light into light signals at respective central frequencies thereof;
    a delay interferometer for converting a light signal output from said wavelength demultiplexer into an intensity signal and outputting the intensity signal, said delay interferometer including an input port for being supplied with said light signal and a first output port and a second output port for outputting said intensity signal; and
    a light detector for converting said intensity signal into an electric signal, said intensity signal being output from either one of said first output port and said second output port of said delay interferometer depending on the frequency of a light signal output from said wavelength demultiplexer;
    wherein the interval between interferential frequencies at which the output signal output from said delay interferometer is maximum is 2/(2n+1) times the interval between the central frequencies of said WDM light, where n represents a positive number.

5. The receiver according to claim 4, further comprising an optical switch for connecting either one of said first output port and said second output port of said delay interferometer depending on the frequency of a light signal output from said wavelength demultiplexer, to said light detector.

6. A receiver for use in a system for transmitting a WDM light produced by multiplexing a plurality of DPSK-modulated light signals, comprising:
    a delay interferometer for converting said WDM signal into an intensity signal;
    a wavelength demultiplexer for demultiplexing a light signal output from said delay interferometer into light signals at respective central frequencies of said WDM light;
    a light detector for converting a light signal output from said wavelength demultiplexer into an electric signal; and
    a logic inverting circuit for outputting an output signal from said light detector while non-inverting or inverting the logic level thereof depending on the frequency of a light signal output from said wavelength demultiplexer;
    wherein the interval between interferential frequencies at which the output signal output from said delay interferometer is maximum is 2/(2n+1) times the interval between the central frequencies of said WDM light, where n represents a positive number.

7. A receiver for use in a system for transmitting a WDM light produced by multiplexing a plurality of DPSK-modulated light signals, comprising:
- a delay interferometer for converting said WDM light into an intensity signal and outputting the intensity signal, said delay interferometer including an input port for being supplied with said WDM light and a first output port and a second output port for outputting said intensity signal;
- a first wavelength demultiplexer and a second wavelength demultiplexer for demultiplexing light signals output from said delay interferometer into light signals at respective central frequencies of said WDM light, said first wavelength demultiplexer being connected to the first output port of said delay interferometer, said second wavelength demultiplexer being connected to the second output port of said delay interferometer; and
- a first light detector and a second light detector for converting the light signals output from said first wavelength demultiplexer and said second wavelength demultiplexer into electric signals, said first light detector and said second light detector being differently connected to said first wavelength demultiplexer and said second wavelength demultiplexer depending on the frequencies of the light signals output from said first wavelength demultiplexer and said second wavelength demultiplexer;
- wherein the interval between interferential frequencies at which the output signal output from said delay interferometer is maximum is $2/(2n+1)$ times the interval between the central frequencies of said WDM light, where n represents a positive number.

8. The receiver according to claim 7, further comprising an optical switch for changing connections between said first wavelength demultiplexer and said second wavelength demultiplexer, and said first light detector and said second light detector depending on the frequencies of the light signals output from said first wavelength demultiplexer and said second wavelength demultiplexer.

9. A receiver for use in a system for transmitting a WDM light produced by multiplexing a plurality of DPSK-modulated light signals, comprising:
- a delay interferometer for converting said WDM light into an intensity signal and outputting the intensity signal, said delay interferometer including an input port for being supplied with said WDM light and a first output port and a second output port for outputting said intensity signal;
- a first wavelength demultiplexer and a second wavelength demultiplexer for demultiplexing light signals output from said delay interferometer into light signals at respective central frequencies of said WDM light, said first wavelength demultiplexer being connected to the first output port of said delay interferometer, said second wavelength demultiplexer being connected to the second output port of said delay interferometer; and
- a light detector for converting the light signal output from either one of said first wavelength demultiplexer and said second wavelength demultiplexer, depending on the frequencies of the light signals output from said first wavelength demultiplexer and said second wavelength demultiplexer, into an electric signal;
- wherein the interval between interferential frequencies at which the output signal output from said delay interferometer is maximum is $2/(2n+1)$ times the interval between the central frequencies of said WDM light, where n represents a positive number.

10. The receiver according to claim 9, further comprising an optical switch for connecting either one of said first wavelength demultiplexer and said second wavelength demultiplexer depending on the frequencies of the light signals output from said first wavelength demultiplexer and said second wavelength demultiplexer, to said light detector.

11. An optical communication system comprising:
- a transmitter including a logic inverting circuit for outputting transmission data while selectively non-inverting and inverting the transmission data, a plurality of DSPK signal generators for DPSK-modulating an output signal from said logic inverting circuit, and a wavelength multiplexer for outputting a WDM light produced by wavelength-division-multiplexing output signals from said DSPK signal generators; and
- a receiver including a wavelength demultiplexer for demultiplexing said WDM light into light signals at respective central frequencies thereof, a delay interferometer for converting a light signal output from said wavelength demultiplexer into an intensity signal, and a light detector for converting said intensity signal into an electric signal;
- wherein the interval between interferential frequencies at which the output signal output from said delay interferometer is maximum is $2/(2n+1)$ times the interval between the central frequencies of said WDM light, where n represents a positive number; and
- said logic inverting circuit outputs said transmission data while non-inverting or inverting the logic level thereof depending on a frequency which is used by said DSPK signal generators for DPSK-modulating the output signal.

12. An optical communication system comprising:
- a transmitter including a plurality of DSPK signal generators for DPSK-modulating transmission data, and a wavelength multiplexer for outputting a WDM light produced by wavelength-division-multiplexing output signals from said DSPK signal generators; and
- a receiver including a wavelength demultiplexer for demultiplexing said WDM light into light signals at respective central frequencies thereof, a delay interferometer for converting a light signal output from said wavelength demultiplexer into an intensity signal, a light detector for converting said intensity signal into an electric signal, and a logic inverting circuit for outputting an output signal from said light detector while selectively non-inverting and inverting the logic level thereof depending on the frequencies of light signals output from said wavelength demultiplexer;
- wherein the interval between interferential frequencies at which the output signal output from said delay interferometer is maximum is $2/(2n+1)$ times the interval between the central frequencies of said WDM light, where n represents a positive number.

13. An optical communication system comprising:
- a transmitter including a logic inverting circuit for outputting transmission data while selectively non-inverting and inverting the transmission data, a plurality of DSPK signal generators for DPSK-modulating an output signal from said logic inverting circuit, and a wavelength multiplexer for outputting a WDM light produced by wavelength-division-multiplexing output signals from said DSPK signal generators; and
- a receiver including a delay interferometer for converting said WDM signal into an intensity signal, a wavelength demultiplexer for demultiplexing a light signal output from said delay interferometer into light signals at the respective central frequencies of said WDM light, and a
light detector for converting the light signals output from
said wavelength demultiplexer into electric signals;
wherein the interval between interferential frequencies at
which the output signal output from said delay interferometer is maximum is $2/(2n+1)$ times the interval between the central frequencies of said WDM light, where n represents a positive number; and
said logic inverting circuit outputs said transmission data while non-inverting or inverting the logic level thereof depending on a frequency which is used by said DSPK signal generators for DPSK-modulating the output signal.

14. An optical communication system comprising:
a transmitter including a plurality of DSPK signal generators for DPSK-modulating transmission data, and a wavelength multiplexer for outputting a WDM light produced by wavelength-division-multiplexing output signals from said DSPK signal generators; and
a receiver including a delay interferometer for converting said WDM signal into an intensity signal, a wavelength demultiplexer for demultiplexing a light signal output from said delay interferometer into light signals at the respective central frequencies of said WDM light, a light detector for converting a light signal output from said wavelength demultiplexer into an electric signal, and a logic inverting circuit for outputting an output signal from said light detector while non-inverting or inverting the logic level thereof depending on the frequencies of the light signals output from said wavelength demultiplexer;
wherein the interval between interferential frequencies at which the output signal output from said delay interferometer is maximum is $2/(2n+1)$ times the interval between the central frequencies of said WDM light, where n represents a positive number.

15. A method of receiving a WDM light produced by multiplexing a plurality of DPSK-modulated light signals, comprising:
demultiplexing said WDM light into light signals at respective central frequencies thereof;
converting a light signal output from said wavelength demultiplexer into an intensity signal, with a delay interferometer;
converting said intensity signal into an electric signal; and
outputting the output signal from said light detector while non-inverting or inverting the logic level thereof depending on the frequency of a light signal output from said wavelength demultiplexer, with a logic inverting circuit;
wherein the interval between interferential frequencies at which the output signal output from said delay interferometer is maximum is $2/(2n+1)$ times the interval between the central frequencies of said WDM light, where n represents a positive number.

16. A method of receiving a WDM light produced by multiplexing a plurality of DPSK-modulated light signals, comprising:
converting said WDM signal into an intensity signal, with a delay interferometer;
demultiplexing a light signal output from said delay interferometer into light signals at respective central frequencies of said WDM light, with a wavelength demultiplexer;
converting a light signal output from said wavelength demultiplexer into an electric signal, with a light detector; and outputting an output signal from said light detector while non-inverting or inverting the logic level thereof depending on the frequency of a light signal output from said wavelength demultiplexer, with a logic inverting circuit;
wherein the interval between interferential frequencies at which the output signal output from said delay interferometer is maximum is $2/(2n+1)$ times the interval between the central frequencies of said WDM light, where n represents a positive number.

17. An optical communication method wherein
a transmitter:
outputs transmission data while selectively non-inverting and inverting the transmission data with a logic inverting circuit;
DPSK-modulates a light signal corresponding to an output signal from said logic inverting circuit; and
generates and outputs a WDM light produced by wavelength-division-multiplexing a plurality of DPSK-modulated light signals; and
a receiver:
upon reception of said WDM light, demultiplexes said WDM light into light signals at respective central frequencies thereof;
converts a light signal at each of the demultiplexed central frequencies into an intensity signal, with a delay interferometer; and
converts said intensity signal into an electric signal;
wherein the interval between interferential frequencies at which the output signal output from said delay interferometer is maximum is $2/(2n+1)$ times the interval between the central frequencies of said WDM light, where n represents a positive number; and
said logic inverting circuit outputs said transmission data while non-inverting or inverting the logic level thereof depending on a frequency which is used for DPSK-modulating the light signal.

18. An optical communication method wherein
a transmitter:
DPSK-modulates a light signal corresponding to transmission data; and
generates and outputs a WDM light produced by wavelength-division-multiplexing a plurality of DPSK-modulated light signals; and
a receiver:
upon reception of said WDM light, demultiplexes said WDM light into light signals at respective central frequencies thereof;
converts a light signal at each of the demultiplexed central frequencies into an intensity signal, with a delay interferometer;
converts said intensity signal into an electric signal; and
outputs said electric signal while non-inverting or inverting the logic level thereof depending on the frequencies of the demultiplexed light signals, with a logic inverting circuit;
wherein the interval between interferential frequencies at which the output signal output from said delay interferometer is maximum is $2/(2n+1)$ times the interval between the central frequencies of said WDM light, where n represents a positive number.

19. An optical communication method wherein
a transmitter:
outputs transmission data while selectively non-inverting and inverting the transmission data, with a logic inverting circuit;

DPSK-modulates a light signal corresponding to an output signal from said logic inverting circuit; and generates and outputs a WDM light produced by wavelength-division-multiplexing a plurality of DPSK-modulated light signals; and a receiver:

upon reception of said WDM light, converts said WDM light into an intensity signal, with a delay interferometer;

demultiplexes a light signal output from said delay interferometer into light signals at the respective central frequencies of said WDM light; and converts the demultiplexed light signals into electric signals;

wherein the interval between interferential frequencies at which the output signal output from said delay interferometer is maximum is 2/(2n+1) times the interval between the central frequencies of said WDM light, where n represents a positive number; and said logic inverting circuit outputs said transmission data while non-inverting or inverting the logic level thereof depending on a frequency which is used for DPSK-modulating the light signal.

20. An optical communication method wherein a transmitter:

DPSK-modulates a light signal corresponding to transmission data; and generates and outputs a WDM light produced by wavelength-division-multiplexing a plurality of DPSK-modulated light signals; and a receiver:

upon reception of said WDM light, converts said WDM light into an intensity signal, with a delay interferometer;

demultiplexes a light signal output from said delay interferometer into light signals at the respective central frequencies of said WDM light;

converts the demultiplexed light signals into electric signals; and outputs the electric signals while non-inverting or inverting the logic level thereof depending on the frequencies of the demultiplexed light signals, with a logic inverting circuit;

wherein the interval between interferential frequencies at which the output signal output from said delay interferometer is maximum is 2/(2n+1) times the interval between the central frequencies of said WDM light, where n represents a positive number.

* * * * *